US011551716B2

(12) United States Patent
Kasada

(10) Patent No.: US 11,551,716 B2
(45) Date of Patent: *Jan. 10, 2023

(54) MAGNETIC TAPE HAVING CHARACTERIZED MAGNETIC LAYER AND MAGNETIC RECORDING AND REPRODUCING DEVICE

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,274

(22) Filed: Jul. 6, 2021

(65) Prior Publication Data

US 2021/0335387 A1 Oct. 28, 2021

Related U.S. Application Data

(63) Continuation of application No. 16/361,597, filed on Mar. 22, 2019.

(30) Foreign Application Priority Data

Mar. 23, 2018 (JP) .............................. JP2018-057168
Mar. 18, 2019 (JP) .............................. JP2019-050217

(51) Int. Cl.
*G11B 5/735* (2006.01)
*G11B 5/712* (2006.01)
(Continued)

(52) U.S. Cl.
CPC .............. *G11B 5/78* (2013.01); *G11B 5/7085* (2013.01); *G11B 5/71* (2013.01); *G11B 5/712* (2013.01);
(Continued)

(58) Field of Classification Search
None
See application file for complete search history.

(56) References Cited

U.S. PATENT DOCUMENTS 3,966,686 A 6/1976 Asakura et al.
4,112,187 A 9/1978 Asakura et al.
(Continued)

FOREIGN PATENT DOCUMENTS

CA 2 282 171 A1 3/2000
CN 1630680 A 6/2005
(Continued)

OTHER PUBLICATIONS

International Preliminary Report on Patentability dated Mar. 31, 2020 from the International Bureau in International Application No. PCT/JP2018/033530.
(Continued)

*Primary Examiner* — Kevin M Bernatz
(74) *Attorney, Agent, or Firm* — Sughrue Mion, PLLC

(57) ABSTRACT

The magnetic tape includes a non-magnetic support; and a magnetic layer including ferromagnetic powder and a binding agent on the non-magnetic support, in which an absolute value ΔN of a difference between a refractive index Nxy measured regarding an in-plane direction of the magnetic layer and a refractive index Nz measured regarding a thickness direction of the magnetic layer is 0.25 to 0.40, and a logarithmic decrement acquired by a pendulum viscoelasticity test performed regarding a surface of the magnetic layer is equal to or smaller than 0.050.

7 Claims, 3 Drawing Sheets

(51) Int. Cl.
*G11B 5/708* (2006.01)
*G11B 5/71* (2006.01)
*G11B 5/714* (2006.01)
*G11B 5/706* (2006.01)
*G11B 5/78* (2006.01)
*G11B 5/84* (2006.01)

(52) U.S. Cl.
CPC .............. *G11B 5/714* (2013.01); *G11B 5/735* (2013.01); *G11B 5/84* (2013.01); *G11B 5/70678* (2013.01)

(56) References Cited

U.S. PATENT DOCUMENTS

| | | |
|---|---|---|
| 4,425,404 A | 1/1984 | Suzuki et al. |
| 4,524,108 A | 6/1985 | Kawakami |
| 4,590,119 A | 5/1986 | Kawakami et al. |
| 4,693,930 A | 9/1987 | Kuo et al. |
| 4,731,292 A | 3/1988 | Sasaki et al. |
| 4,746,569 A | 5/1988 | Takahashi et al. |
| 4,818,606 A | 4/1989 | Koyama et al. |
| 4,825,317 A | 4/1989 | Rausch |
| 4,861,674 A | 8/1989 | Inaba et al. |
| 5,006,406 A | 4/1991 | Kovacs |
| 5,242,752 A | 9/1993 | Isobe et al. |
| 5,419,938 A | 5/1995 | Kagotani et al. |
| 5,445,881 A | 9/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,258,519 B1 | 7/2001 | Matsunaga et al. |
| 6,261,647 B1 | 7/2001 | Komatsu et al. |
| 6,268,043 B1 | 7/2001 | Koizumi et al. |
| 6,282,051 B1 | 8/2001 | Albrecht et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Ejiri |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,341,798 B2 | 3/2008 | Hirai |
| 7,474,505 B2 | 1/2009 | Hirai |
| 7,511,907 B2 | 3/2009 | Dugas et al. |
| 7,515,383 B2 | 4/2009 | Saito et al. |
| 7,656,602 B2 | 2/2010 | Iben et al. |
| 7,755,863 B2 | 7/2010 | Neumann et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,318,242 B2 | 11/2012 | Bradshaw et al. |
| 8,524,108 B2 | 9/2013 | Hattori |
| 8,535,817 B2 * | 9/2013 | Imaoka ................ G11B 5/7085 428/844 |
| 8,576,510 B2 | 11/2013 | Cherubini et al. |
| 8,609,264 B2 | 12/2013 | Mitsuoka et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 10/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Rata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 * | 5/2018 | Kaneko ................ G11B 5/00826 |
| 9,978,414 B1 | 5/2018 | Kaneko et al. |
| 9,984,710 B2 * | 5/2018 | Kasada .................... G11B 5/70 |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 * | 7/2018 | Kasada .................... G11B 5/842 |
| 10,026,434 B2 * | 7/2018 | Oyanagi ................ G11B 5/842 |
| 10,026,435 B2 | 7/2018 | Kasada et al. |
| 10,062,403 B1 * | 8/2018 | Kasada .................... G11B 5/70 |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 10,347,280 B2 | 7/2019 | Kasada et al. |
| 10,373,633 B2 | 8/2019 | Kaneko et al. |
| 10,373,639 B2 | 8/2019 | Kasada et al. |
| 10,403,314 B2 * | 9/2019 | Kasada .................... G11B 5/78 |
| 10,403,319 B2 | 9/2019 | Kasada |
| 10,403,320 B2 * | 9/2019 | Kasada .................... G11B 5/70 |
| 10,410,666 B2 | 9/2019 | Kasada et al. |
| 10,431,248 B2 | 10/2019 | Kasada et al. |
| 10,431,249 B2 | 10/2019 | Kasada et al. |
| 10,431,250 B2 * | 10/2019 | Tada .................... G11B 5/70615 |
| 10,438,624 B2 * | 10/2019 | Kasada ................ G11B 5/7085 |
| 10,438,625 B2 * | 10/2019 | Ozawa ................ G11B 5/00813 |
| 10,438,628 B2 | 10/2019 | Kasada et al. |
| 10,453,488 B2 * | 10/2019 | Kurokawa ................ C08K 3/20 |
| 10,460,756 B2 * | 10/2019 | Kasada .................... G11B 5/00813 |
| 10,475,481 B2 | 11/2019 | Oyanagi et al. |
| 10,477,072 B2 | 11/2019 | Kasada |
| 10,482,913 B2 * | 11/2019 | Kasada .................... G11B 5/712 |
| 10,490,220 B2 | 11/2019 | Kasada et al. |
| 10,497,384 B2 * | 12/2019 | Kasada .................... G11B 5/78 |
| 10,497,388 B2 | 12/2019 | Ozawa et al. |
| 10,510,366 B2 | 12/2019 | Kaneko et al. |
| 10,515,657 B2 * | 12/2019 | Kasada .................... G11B 5/735 |
| 10,515,660 B2 * | 12/2019 | Oyanagi .................... G11B 5/65 |
| 10,515,661 B2 | 12/2019 | Kasada et al. |
| 10,522,171 B2 * | 12/2019 | Kasada .................... G11B 5/59633 |
| 10,522,180 B2 | 12/2019 | Kasada |
| 10,546,602 B2 * | 1/2020 | Kasada .................... G11B 5/02 |
| 10,573,338 B2 * | 2/2020 | Kasada ................ G11B 5/70678 |
| 10,643,646 B2 * | 5/2020 | Kasada .................... G11B 5/70 |
| 10,672,426 B2 | 6/2020 | Kasada |
| 10,706,875 B2 | 7/2020 | Kasada et al. |
| 10,720,181 B1 | 7/2020 | Yamaga et al. |
| 10,755,741 B2 | 8/2020 | Ozawa et al. |
| 10,839,850 B2 | 11/2020 | Tada et al. |
| 10,854,227 B2 * | 12/2020 | Kasada .................... G11B 5/735 |
| 10,854,231 B2 | 12/2020 | Kasada et al. |
| 10,854,234 B2 * | 12/2020 | Kasada .................... G11B 5/71 |
| 10,878,846 B2 | 12/2020 | Kasada et al. |
| 10,891,982 B2 | 1/2021 | Kasada |
| 10,902,874 B2 * | 1/2021 | Kasada .................... G11B 5/70 |

(56) References Cited

U.S. PATENT DOCUMENTS

| | | | |
|---|---|---|---|
| 10,910,009 B2* | 2/2021 | Oyanagi | G11B 5/714 |
| 11,158,340 B2 | 10/2021 | Bradshaw | |
| 11,361,793 B2* | 6/2022 | Kasada | G11B 5/78 |
| 11,417,357 B2* | 8/2022 | Kasada | G11B 5/70 |
| 11,417,358 B2* | 8/2022 | Kasada | G11B 20/10046 |
| 2001/0012574 A1 | 8/2001 | Matsubayashi et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0017366 A1 | 1/2003 | Takahashi et al. | |
| 2003/0059649 A1 | 3/2003 | Saliba et al. | |
| 2003/0091866 A1 | 5/2003 | Eijiri et al. | |
| 2003/0121284 A1 | 7/2003 | Ikeda et al. | |
| 2003/0124386 A1 | 7/2003 | Masaki | |
| 2003/0128453 A1 | 7/2003 | Saito et al. | |
| 2003/0170498 A1 | 9/2003 | Inoue | |
| 2003/0203240 A1 | 10/2003 | Seng et al. | |
| 2003/0228492 A1 | 12/2003 | Ejiri et al. | |
| 2003/0228493 A1 | 12/2003 | Doushita et al. | |
| 2004/0013892 A1 | 1/2004 | Yano et al. | |
| 2004/0018388 A1 | 1/2004 | Kitamura et al. | |
| 2004/0023066 A1 | 2/2004 | Watase et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0020803 A1 | 1/2005 | Machida et al. | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0083954 A1 | 4/2006 | Meguro et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0142625 A1 | 6/2009 | Fukushima et al. | |
| 2009/0161249 A1 | 6/2009 | Takayama et al. | |
| 2009/0162701 A1 | 6/2009 | Jensen et al. | |
| 2009/0174970 A1 | 7/2009 | Inoue et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2010/0284105 A1 | 11/2010 | Dugas et al. | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0229739 A1 | 9/2011 | Jensen et al. | |
| 2011/0244272 A1 | 10/2011 | Suzuki et al. | |
| 2012/0003503 A1 | 1/2012 | Mori | |
| 2012/0045664 A1 | 2/2012 | Tanaka et al. | |
| 2012/0152891 A1 | 6/2012 | Brown et al. | |
| 2012/0177951 A1 | 7/2012 | Yamazaki et al. | |
| 2012/0183811 A1 | 7/2012 | Hattori et al. | |
| 2012/0196156 A1 | 8/2012 | Suzuki | |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |
| 2012/0314319 A1 | 12/2012 | Olson et al. | |
| 2013/0029183 A1 | 1/2013 | Omura et al. | |
| 2013/0084470 A1 | 4/2013 | Hattori et al. | |
| 2013/0088794 A1 | 4/2013 | Cherubini et al. | |
| 2013/0256584 A1 | 10/2013 | Yamazaki et al. | |
| 2013/0260179 A1 | 10/2013 | Kasada et al. | |
| 2013/0279040 A1 | 10/2013 | Cideciyan et al. | |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1 | 9/2014 | Kasada | |
| 2014/0295214 A1 | 10/2014 | Tada et al. | |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0279404 A1 | 10/2015 | Aoshima et al. | |
| 2015/0302879 A1 | 10/2015 | Holmberg et al. | |
| 2015/0380036 A1 | 12/2015 | Kasada et al. | |
| 2016/0171993 A1 | 1/2016 | Okubo | |
| 2016/0061447 A1 | 3/2016 | Kobayashi | |
| 2016/0064025 A1 | 3/2016 | Kurokawa et al. | |
| 2016/0092315 A1 | 3/2016 | Ashida et al. | |
| 2016/0093321 A1 | 3/2016 | Aoshima et al. | |
| 2016/0093322 A1 | 3/2016 | Kasada et al. | |
| 2016/0093323 A1 | 3/2016 | Omura | |
| 2016/0180875 A1 | 6/2016 | Tanaka et al. | |
| 2016/0189739 A1 | 6/2016 | Kasada et al. | |
| 2016/0189740 A1 | 6/2016 | Oyanagi et al. | |
| 2016/0247530 A1 | 8/2016 | Kasada | |
| 2016/0260449 A1 | 9/2016 | Ahmad et al. | |
| 2016/0276076 A1 | 9/2016 | Kasada | |
| 2017/0032812 A1 | 2/2017 | Kasada | |
| 2017/0053669 A1 | 2/2017 | Kasada | |
| 2017/0053670 A1 | 2/2017 | Oyanagi et al. | |
| 2017/0053671 A1 | 2/2017 | Kasada et al. | |
| 2017/0058227 A1 | 3/2017 | Kondo et al. | |
| 2017/0092315 A1 | 3/2017 | Ozawa et al. | |
| 2017/0092316 A1 | 3/2017 | Imamura et al. | |
| 2017/0130156 A1 | 5/2017 | Kondo et al. | |
| 2017/0162220 A1 | 6/2017 | Nakashio et al. | |
| 2017/0178675 A1 | 6/2017 | Kasada | |
| 2017/0178676 A1 | 6/2017 | Kasada | |
| 2017/0178677 A1 | 6/2017 | Kasada | |
| 2017/0186456 A1 | 6/2017 | Tada et al. | |
| 2017/0186460 A1 | 6/2017 | Kasada et al. | |
| 2017/0221513 A1 | 8/2017 | Hiroi et al. | |
| 2017/0221516 A1 | 8/2017 | Oyanagi et al. | |
| 2017/0221517 A1 | 8/2017 | Ozawa et al. | |
| 2017/0249963 A1 | 8/2017 | Oyanagi et al. | |
| 2017/0249964 A1 | 8/2017 | Kasada et al. | |
| 2017/0249965 A1 | 8/2017 | Kurokawa et al. | |
| 2017/0249966 A1 | 8/2017 | Tachibana et al. | |
| 2017/0278533 A1 | 9/2017 | Kasada et al. | |
| 2017/0287517 A1 | 10/2017 | Hosoya et al. | |
| 2017/0355022 A1 | 12/2017 | Kaneko et al. | |
| 2017/0358318 A1 | 12/2017 | Kasada et al. | |
| 2017/0372726 A1 | 12/2017 | Kasada et al. | |
| 2017/0372727 A1 | 12/2017 | Kasada et al. | |
| 2017/0372736 A1 | 12/2017 | Kaneko et al. | |
| 2017/0372737 A1 | 12/2017 | Oyanagi et al. | |
| 2017/0372738 A1 | 12/2017 | Kasada | |
| 2017/0372739 A1 | 12/2017 | Ozawa et al. | |

(56) References Cited

U.S. PATENT DOCUMENTS

| | | |
|---|---|---|
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0137887 A1 | 5/2018 | Sekiguchi et al. |
| 2018/0147626 A1 | 5/2018 | Shirata et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374503 A1 | 12/2018 | Kasada |
| 2018/0374504 A1 | 12/2018 | Kasada |
| 2018/0374505 A1 | 12/2018 | Kasada et al. |
| 2018/0374506 A1 | 12/2018 | Kasada |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027177 A1 | 1/2019 | Kasada |
| 2019/0027178 A1 | 1/2019 | Kasada |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0259416 A1 | 8/2019 | Kawakami et al. |
| 2019/0295581 A1* | 9/2019 | Kasada ............... G11B 5/70 |
| 2019/0295586 A1 | 9/2019 | Kasada |
| 2019/0295587 A1* | 9/2019 | Kasada ............... G11B 5/7085 |
| 2019/0295588 A1 | 9/2019 | Kasada |
| 2019/0295589 A1 | 9/2019 | Kasada |
| 2019/0295590 A1 | 9/2019 | Kaneko et al. |
| 2019/0304496 A1 | 10/2019 | Fujimoto |
| 2020/0005814 A1 | 1/2020 | Kasada et al. |
| 2020/0005818 A1 | 1/2020 | Kasada et al. |
| 2020/0005827 A1 | 1/2020 | Ozawa et al. |
| 2020/0035262 A1 | 1/2020 | Kasada |
| 2020/0035265 A1* | 1/2020 | Kasada ............... G11B 5/70 |
| 2020/0035267 A1 | 1/2020 | Kasada |
| 2020/0126589 A1 | 4/2020 | Iwamoto et al. |
| 2020/0211592 A1 | 7/2020 | Kasada |
| 2020/0211593 A1 | 7/2020 | Kasada |
| 2020/0227081 A1* | 7/2020 | Hosoda ............... G11B 5/78 |
| 2020/0227084 A1* | 7/2020 | Iwamoto ............ G11B 5/00817 |
| 2020/0243110 A1 | 7/2020 | Kasada |
| 2020/0251134 A1 | 8/2020 | Kasada et al. |
| 2020/0251135 A1 | 8/2020 | Kasada et al. |
| 2020/0251139 A1 | 8/2020 | Kasada et al. |
| 2020/0342904 A1 | 10/2020 | Yamaga et al. |
| 2021/0012800 A1 | 1/2021 | Yamaga et al. |
| 2021/0020195 A1* | 1/2021 | Kasada ............... G11B 5/7021 |
| 2021/0082461 A1 | 3/2021 | Bradshaw |
| 2021/0082463 A1 | 3/2021 | Ozawa et al. |
| 2021/0082464 A1 | 3/2021 | Ozawa et al. |
| 2021/0090599 A1 | 3/2021 | Nakano et al. |
| 2021/0125634 A1 | 4/2021 | Yamaga et al. |
| 2021/0241786 A1 | 8/2021 | Kasada et al. |
| 2021/0249043 A1 | 8/2021 | Kasada et al. |
| 2021/0280212 A1* | 9/2021 | Kasada ............... G11B 5/70605 |
| 2021/0287712 A1* | 9/2021 | Iwamoto ............ G11B 5/70 |
| 2021/0295865 A1* | 9/2021 | Kasada ............... G11B 5/7022 |
| 2021/0358521 A1* | 11/2021 | Kasada ............... G11B 5/71 |
| 2022/0036918 A1 | 2/2022 | Kasada |

FOREIGN PATENT DOCUMENTS

| | | |
|---|---|---|
| CN | 1691139 A | 11/2005 |
| CN | 1914275 A | 2/2007 |
| CN | 101105949 A | 1/2008 |
| CN | 102459429 A | 5/2012 |
| CN | 105324650 A | 2/2016 |
| DE | 33 40 381 A1 | 5/1984 |
| DE | 101 46 429 A1 | 3/2002 |
| EP | 0 102 581 A2 | 3/1984 |
| EP | 0 387 420 A2 | 9/1990 |
| EP | 0 416 656 A2 | 3/1991 |
| EP | 0 421 213 A2 | 4/1991 |
| EP | 0 520 155 B1 | 8/1996 |
| GB | 2495356 A | 4/2013 |
| JP | 59-221830 A | 12/1984 |
| JP | 60-66316 A | 4/1985 |
| JP | 60-171626 A | 9/1985 |
| JP | 61-11924 A | 1/1986 |
| JP | 61-139923 A | 6/1986 |
| JP | 61-139932 A | 6/1986 |
| JP | 62-117138 A | 5/1987 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-60819 A | 3/1989 |
| JP | 64-60820 A | 3/1989 |
| JP | 1-276424 A | 11/1989 |
| JP | 1-318953 A | 12/1989 |
| JP | 2-108232 A | 4/1990 |
| JP | 2-168415 A | 6/1990 |
| JP | 2-227821 A | 9/1990 |
| JP | 3-109701 A | 5/1991 |
| JP | 4-123312 A | 4/1992 |
| JP | 5-258283 A | 10/1993 |
| JP | 5-267409 A | 10/1993 |
| JP | 5-298653 A | 11/1993 |
| JP | 7-57242 A | 3/1995 |
| JP | 7-114723 A | 5/1995 |
| JP | 7-244834 A | 9/1995 |
| JP | 7-326044 A | 12/1995 |
| JP | 8-7256 A | 1/1996 |
| JP | 9-73626 A | 3/1997 |
| JP | 9-190623 A | 7/1997 |
| JP | 10-149788 A | 6/1998 |
| JP | 10-303199 A | 11/1998 |
| JP | 11-073630 A | 3/1999 |
| JP | 11-110743 A | 4/1999 |
| JP | 11-175949 A | 7/1999 |
| JP | 11-259849 A | 9/1999 |

(56) References Cited

FOREIGN PATENT DOCUMENTS

| | | |
|---|---|---|
| JP | 11-273051 A | 10/1999 |
| JP | 2000-90429 A | 3/2000 |
| JP | 2000-241319 A | 9/2000 |
| JP | 2000-251240 A | 9/2000 |
| JP | 2002-8910 A | 1/2002 |
| JP | 2002-157726 A | 5/2002 |
| JP | 2002-222515 A | 8/2002 |
| JP | 2002-298332 A | 10/2002 |
| JP | 2002-329605 A | 11/2002 |
| JP | 2002-347197 A | 12/2002 |
| JP | 2002-367142 A | 12/2002 |
| JP | 2002-367318 A | 12/2002 |
| JP | 2002-373414 A | 12/2002 |
| JP | 2003-77116 A | 3/2003 |
| JP | 2003-296918 A | 10/2003 |
| JP | 2003-323710 A | 11/2003 |
| JP | 2004-5793 A | 1/2004 |
| JP | 2004-005820 A | 1/2004 |
| JP | 2004-55137 A | 2/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-25870 A | 1/2005 |
| JP | 2005-29656 A | 2/2005 |
| JP | 2005-038579 A | 2/2005 |
| JP | 2005-209265 A | 8/2005 |
| JP | 2005-243063 A | 9/2005 |
| JP | 2005-243162 A | 9/2005 |
| JP | 2006-54018 A | 2/2006 |
| JP | 2006-92672 A | 4/2006 |
| JP | 2006-234835 A | 9/2006 |
| JP | 2006-257434 A | 9/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-294085 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-32338 A | 2/2009 |
| JP | 2009-093738 A | 4/2009 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-134372 A | 7/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2012-203956 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2015-201241 A | 11/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-110680 A | 6/2016 |
| JP | 2016-126817 A | 7/2016 |
| JP | 2016-139451 A | 8/2016 |
| JP | 2016-177851 A | 10/2016 |
| JP | 2017-16732 A | 1/2017 |
| JP | 2017-041291 A | 2/2017 |
| JP | 2017-041296 A | 2/2017 |
| JP | 2017-174475 A | 9/2017 |
| JP | 2017-228328 A | 12/2017 |
| JP | 2017-228331 A | 12/2017 |
| JP | 2018-73454 A | 5/2018 |
| JP | 2018-92693 A | 6/2018 |
| JP | 2019-08847 A | 1/2019 |
| JP | 2019-169230 A | 10/2019 |
| WO | 2019/065199 A1 | 4/2019 |
| WO | 2019/065200 A1 | 4/2019 |

OTHER PUBLICATIONS

International Preliminary Report on Patentability dated Mar. 31, 2020 in International Application No. PCT/JP2018/033531.
International Search Report dated Nov. 20, 2018 from the International Searching Authority in International Application No. PCT/JP2018/033530.
International Search Report dated Nov. 20, 2018 in International Application No. PCT/JP2018/033531.
Notice of Allowance dated Apr. 28, 2021 in U.S. Appl. No. 16/361,589.
Notice of Allowance dated Apr. 7, 2021 in U.S. Appl. No. 16/361,597.
Notice of Allowance dated Feb. 26, 2021 in U.S. Appl. No. 16/777,411.
Notice of Allowance dated Feb. 3, 2021 in U.S. Appl. No. 16/832,788.
Notice of Allowance dated Jul. 28, 2020 in U.S. Appl. No. 16/361,589.
Notice of Allowance dated Jul. 29, 2020 in U.S. Appl. No. 16/361,597.
Notice of Allowance dated Jun. 23, 2020 in U.S. Appl. No. 16/522,894.
Notice of Allowance dated Mar. 8, 2021 in U.S. Appl. No. 16/727,181.
Notice of Allowance dated Mar. 9, 2021 in U.S. Appl. No. 16/522,894.
Notice of Allowance dated Nov. 12, 2020 in U.S. Appl. No. 16/777,411.
Notice of Allowance dated Nov. 4, 2020 in U.S. Appl. No. 16/727,181.
Notice of Allowance dated Nov. 5, 2020 in U.S. Appl. No. 16/361,597.
Notice of Allowance dated Sep. 17, 2020 in U.S. Appl. No. 16/522,867.
Office Action dated Apr. 19, 2021 in U.S. Appl. No. 17/032,621.
Office Action dated Jul. 20, 2020 in U.S. Appl. No. 16/777,411.
Office Action dated Jun. 25, 2020 in U.S. Appl. No. 16/727,181.
Office Action dated Mar. 13, 2020 in U.S. Appl. No. 16/361,589.
Office Action dated Mar. 13, 2020 in U.S. Appl. No. 16/361,597.
Office Action dated Mar. 13, 2020 in U.S. Appl. No. 16/522,867.
Office Action dated Mar. 2, 2020 in U.S. Appl. No. 16/522,894.
Office Action dated Nov. 3, 2020 in Chinese Application No. 201880063019.7; corresponds to U.S. Appl. No. 16/832,788.
Office Action dated Nov. 6, 2020 in Chinese Application No. 201880062980.4; corresponds to U.S. Appl. No. 16/832,284.
Office Action dated Sep. 15, 2020 in U.S. Appl. No. 16/832,284.
Office Action dated Sep. 15, 2020 in U.S. Appl. No. 16/832,788.
Office Action dated Sep. 23, 2020 in Japanese Application No. 2019-050201, corresponds to U.S. Appl. No. 16/361,589.
Office Action dated Sep. 29, 2020 in Japanese Application No. 2018-141866, corresponds to U.S. Appl. No. 16/522,867.
Office Action dated Sep. 29, 2020 in Japanese Application No. 2018-141867, corresponds to U.S. Appl. No. 16/522,894.
Office Action dated Sep. 29, 2020 in Japanese Application No. 2018-246871, corresponds to U.S. Appl. No. 16/727,181.
Written Opinion dated Nov. 20, 2018 from the International Bureau in International Application No. PCT/JP2018/033530.
Written Opinion dated Nov. 20, 2018 from the International Bureau in International Application No. PCT/JP2018/033531.
Notice of Allowance dated Feb. 3, 2021 in U.S. Appl. No. 16/832,284.
Notice of Allowance dated Dec. 9, 2020 in U.S. Appl. No. 16/727,181.
Notice of Allowance dated Dec. 31, 2020 in U.S. Appl. No. 16/361,589.
Advisory Action dated Jul. 5, 2018 in U.S. Appl. No. 14/838,663.
Office Action dated Apr. 26, 2017 which issued during the prosecution of U.S. Appl. No. 15/388,864.

(56) References Cited

OTHER PUBLICATIONS

Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.

(56) References Cited

OTHER PUBLICATIONS

Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Aug. 23, 2019 in U.S. Appl. No. 15/854,409.
Office Action dated Aug. 25, 2017 in U.S. Appl. No. 14/838,663.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.

(56) References Cited

OTHER PUBLICATIONS

Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2016-254450.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2017-065730.
Office Action dated Sep. 3, 2019 in Japanese Application No. 2016-254434.
Office Action dated Oct. 1, 2019 in Japanese Application No. 2017-029495.
Office Action dated Oct. 1, 2019 in Japanese Application No. 2017-029493.
Office Action dated Oct. 1, 2019 in Japanese Application No. 2017-029494.
Office Action dated Oct. 2, 2019 in U.S. Appl. No. 15/443,094.
Office Action dated Oct. 5, 2017 from the United States Patent and Trademark Office in U.S. Appl. No. 15/241,286.
Office Action dated Oct. 5, 2017 from the United States Patent and Trademark Office in U.S. Appl. No. 15/241,631.
Office Action dated Oct. 5, 2017 from the United States Patent and Trademark Office in U.S. Appl. No. 15/378,907.
Office Action dated Oct. 5, 2017 from the United States Patent and Trademark Office in U.S. Appl. No. 15/241,297.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Notice of Allowance dated Mar. 21, 2018 in U.S. Appl. No. 15/241,297.
Office Action dated Oct. 8, 2019 in Japanese Application No. 2017-029492.
Office Action dated Oct. 8, 2019 in Japanese Application No. 2017-065700.
Office Action dated Oct. 8, 2019 in Japanese Application No. 2017-065708.
Office Action dated Oct. 8, 2019 in Japanese Application No. 2017-065678.
Office Action dated Oct. 10, 2019 in U.S. Appl. No. 15/705,531.
Office Action dated Oct. 9, 2019 in U.S. Appl. No. 16/440,161.
Office Action dated Oct. 22, 2019 in U.S. Appl. No. 16/037,564.
Notice of Allowance dated Oct. 17, 2019 in U.S. Appl. No. 15/388,911.
Office Action dated Dec. 10, 2019 in Japanese Application No. 2016-254428.
Office Action dated Dec. 17, 2019 in Japanese Application No. 2016-254430.
Office Action dated Dec. 17, 2019 in Japanese Application No. 2016-254432.
Office Action dated Dec. 17, 2019 in Japanese Application No. 2017-029507.
Office Action dated Dec. 24, 2019 in Japanese Application No. 2016-254434.
Office Action dated Dec. 24, 2019 in Japanese Application No. 2017-029510.
Office Action dated Nov. 26, 2019 in Japanese Application No. 2016-254421.
Office Action dated Nov. 26, 2019 in Japanese Application No. 2017-029496.
Office Action dated Nov. 26, 2019 in Japanese Application No. 2017-029502.
Office Action dated Nov. 26, 2019 in Japanese Application No. 2017-065694.
Advisory Action dated Jan. 17, 2020 in U.S. Appl. No. 15/443,094.
Office Action dated Jan. 28, 2020 in U.S. Appl. No. 15/442,961.
Notice of Allowance dated Feb. 7, 2020 in U.S. Appl. No. 16/440,161.
Notice of Allowance dated Feb. 20, 2020 in U.S. Appl. No. 15/705,531.
Office Action dated Feb. 21, 2020 in U.S. Appl. No. 16/038,514.
Notice of Allowance dated Mar. 18, 2020 in U.S. Appl. No. 16/037,564.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,884.
Office Action dated Mar. 10, 2020 in U.S. Appl. No. 16/038,847.
Office Action dated Mar. 10, 2020 in U.S. Appl. No. 16/142,560.

(56) References Cited

OTHER PUBLICATIONS

Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Office Action dated Mar. 31, 2020 in U.S. Appl. No. 15/443,026.
Office Action dated Apr. 1, 2020 in U.S. Appl. No. 15/443,094.
Office Action dated Apr. 29, 2020 in U.S. Appl. No. 16/012,018.
Notice of Allowance dated May 7, 2020 in U.S. Appl. No. 16/038,514.
Notice of Allowance dated Aug. 17, 2020 in U.S. Appl. No. 15/443,026.
Notice of Allowance dated Aug. 3, 2020 in U.S. Appl. No. 16/038,847.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated Sep. 17, 2020 in U.S. Appl. No. 16/012,018.
Office Action dated Aug. 25, 2020 in Chinese Application No. 201711439496.2.
Office Action dated Jul. 8, 2020 in U.S. Appl. No. 15/442,961.
Notice of Allowance dated Sep. 23, 2020 in U.S. Appl. No. 15/443,094.
Notice of Allowance dated Nov. 13, 2020 in U.S. Appl. No. 15/442,961.
Office Action dated Sep. 27, 2019 in U.S. Appl. No. 16/361,570.
Communication dated Mar. 3, 2020 by the Japanese Patent Office in application No. 2017-123062; corresponds to U.S. Appl. No. 16/009,461.
Office Action dated Jun. 10, 2020 in U.S. Appl. No. 16/848,331.
Office Action dated Jun. 16, 2020 in U.S. Appl. No. 16/777,201.
Office Action dated Aug. 18, 2020 in U.S. Appl. No. 16/361,797.
Office Action dated Sep. 2, 2020 in U.S. Appl. No. 16/361,814.
Notice of Allowance dated Dec. 31, 2020 in U.S. Appl. No. 16/143,747.
Office Action dated Mar. 10, 2020 in U.S. Appl. No. 16/143,747.
Notice of Allowance dated Sep. 16, 2020 in U.S. Appl. No. 16/848,331.
Notice of Allowance dated Oct. 1, 2020 in U.S. Appl. No. 16/777,201.
Notice of Allowance dated Dec. 2, 2020 in U.S. Appl. No. 16/361,797.
U.S. Appl. No. 17/328,620, filed May 24, 2021 (Kasada).
U.S. Appl. No. 17/330,680, filed May 26, 2021 (Kasada).
U.S. Appl. No. 17/326,458, filed May 21, 2021 (Iwamoto).
Office Action dated Jun. 17, 2021 in U.S. Appl. No. 16/522,894.
Office Action dated Jul. 15, 2021 in U.S. Appl. No. 16/832,788.
Notice of Allowance dated Aug. 17, 2021 in U.S. Appl. No. 17/032,621.
Notice of Allowance dated Nov. 16, 2021 in U.S. Appl. No. 16/832,788.
Notice of Allowance dated Sep. 30, 2021 in U.S. Appl. No. 16/522,894.
Office Action dated Aug. 23, 2021 in U.S. Appl. No. 16/777,411.
Office Action dated Oct. 28, 2021 in U.S. Appl. No. 17/326,458.
Office Action dated Oct. 4, 2021 in U.S. Appl. No. 17/328,620.
Office Action dated Mar. 3, 2020 in Japanese Application No. 2017-123062; corresponds to U.S. Appl. No. 16/009,461.
Office Action dated Feb. 3, 2021 in U.S. Appl. No. 16/009,461.
Office Action dated Mar. 2, 2021 in U.S. Appl. No. 16/727,205.
Ridaoui et al., "Effect of Cationic Surfactant and Block Copolymer on Carbon Black Particle Surface Charge and Size", Colloids and Surfaces A: Physiochemical and Engineering Aspects, vol. 278, Elsevier, Jan. 18, 2006, pp. 149-159 (12 pages total).
Notice of Allowance dated Jul. 16, 2021 in U.S. Appl. No. 16/658,565.
Notice of Allowance dated Jul. 8, 2021 in U.S. Appl. No. 16/009,461.
Notice of Allowance dated Mar. 3, 2021 in U.S. Appl. No. 16/361,814.
Office Action dated Mar. 12, 2021 in U.S. Appl. No. 16/658,565.
Office Action dated Mar. 23, 2021 in Japanese Application No. 2020-208022, corresponds to U.S. Appl. No. 16/361,570.
Office Action dated Mar. 23, 2021 in Japanese Application No. 2020-208023, corresponds to U.S. Appl. No. 16/361,814.
Notice of Allowance dated Nov. 26, 2021 in U.S. Appl. No. 16/658,565.
Notice of Allowance dated Oct. 20, 2021 in U.S. Appl. No. 16/727,205.
Office Action dated Oct. 26, 2021 in Japanese Application No. 2018-246873; corresponds to U.S. Appl. No. 16/727,205.
Office Action dated Dec. 2, 2021 in U.S. Appl. No. 17/330,680.
Office Action dated Dec. 7, 2021 in Japanese Application No. 2019-016529, corresponds to U.S. Appl. No. 16/777,201.
Notice of Allowance dated Dec. 15, 2021 in U.S. Appl. No. 16/777,411.
Notice of Allowance dated Jan. 24, 2022 in U.S. Appl. No. 17/032,621.
Notice of Allowance dated Jan. 25, 2022 in U.S. Appl. No. 16/361,814.
Notice of Allowance dated Jan. 27, 2022 in U.S. Appl. No. 16/361,797.
Notice of Allowance dated Jan. 5, 2022 in U.S. Appl. No. 16/727,181.
Notice of Allowance dated Jan. 5, 2022 in U.S. Appl. No. 17/328,620.
Notice of Allowance dated Jan. 7, 2022 in U.S. Appl. No. 16/522,894.
Office Action dated Apr. 27, 2021 in Japanese Application No. 2020-122792, corresponds to U.S. Appl. No. 17/021,529.
Notice of Allowance dated Feb. 8, 2022 in U.S. Appl. No. 16/361,589.
Notice of Allowance dated Feb. 9, 2022 in U.S. Appl. No. 16/361,597.
Office Action dated Feb. 1, 2022 in U.S. Appl. No. 16/832,788.
Office Action dated Nov. 9, 2021 in U.S. Appl. No. 17/021,529.
Notice of Allowance dated Mar. 2, 2022 in U.S. Appl. No. 16/658,565.
Notice of Allowance dated Mar. 4, 2022 in U.S. Appl. No. 16/777,411.
Office Action dated Mar. 1, 2022 in U.S. Appl. No. 16/009,461.
Office Action dated Mar. 16, 2022 in U.S. Appl. No. 16/361,797.
Notice of Allowance dated Mar. 16, 2022 in U.S. Appl. No. 17/330,680.
Notice of Allowance dated Feb. 16, 2022 in U.S. Appl. No. 16/832,284.
Office Action dated Mar. 18, 2022 in U.S. Appl. No. 16/361,814.
U.S. Appl. No. 17/386,616, filed Jul. 28, 2021 (Kasada).
U.S. Appl. No. 17/500,337, filed Oct. 13, 2021 (Kasada).
Notice of Allowance dated Jul. 13, 2022 in U.S. Appl. No. 16/361,814.
Notice of Allowance dated Jul. 15, 2022 in U.S. Appl. No. 16/361,797.
Office Action dated Apr. 19, 2022 in Japanese Application No. 2020-122807, corresponds to U.S. Appl. No. 16/522,894.
Office Action dated Mar. 22, 2022 in Chinese Application No. 202110765961.1, corresponds to U.S. Appl. No. 16/832,284.
Notice of Allowance dated Mar. 22, 2022 in U.S. Appl. No. 17/032,621.
Notice of Allowance dated Mar. 23, 2022 in U.S. Appl. No. 17/328,620.
Notice of Allowance dated Mar. 24, 2022 in U.S. Appl. No. 16/727,205.
Notice of Allowance dated Mar. 29, 2022 in U.S. Appl. No. 16/727,181.
Notice of Allowance dated Apr. 5, 2022 in U.S. Appl. No. 17/326,458.
Notice of Allowance dated Apr. 6, 2022 in U.S. Appl. No. 17/021,529.
Notice of Allowance dated Apr. 12, 2022 in U.S. Appl. No. 16/522,894.
Notice of Allowance dated May 25, 2022 in U.S. Appl. No. 16/658,565.
Notice of Allowance dated May 26, 2022 in U.S. Appl. No. 17/326,458.
Office Action dated Jun. 8, 2022 in U.S. Appl. No. 17/386,616.
Notice of Allowance dated Jun. 27, 2022 in U.S. Appl. No. 16/009,461.
Notice of Allowance dated Jul. 6, 2022 in U.S. Appl. No. 16/832,788.
Office Action dated Aug. 17, 2022 in U.S. Appl. No. 17/500,337.
Notice of Allowance dated Oct. 12, 2022 in U.S. Appl. No. 17/386,616.

* cited by examiner

MAGNETIC TAPE HAVING CHARACTERIZED MAGNETIC LAYER AND MAGNETIC RECORDING AND REPRODUCING DEVICE

CROSS-REFERENCE TO RELATED APPLICATIONS

This application is a continuation of application Ser. No. 16/361,597 filed Mar. 22, 2019 which claims priority under 35 U.S.C. 119 to Japanese Patent Application No. 2018-057168 filed on Mar. 23, 2018 and Japanese Patent Application No. 2019-050217 filed on Mar. 18, 2019. Each of the above applications is hereby expressly incorporated by reference, in its entirety, into the present application.

BACKGROUND OF THE INVENTION

1. Field of the Invention

The present invention relates to a magnetic tape and a magnetic recording and reproducing device.

2. Description of the Related Art

Magnetic recording media are divided into tape-shaped magnetic recording media and disk-shaped magnetic recording media, and tape-shaped magnetic recording media, that is, magnetic tapes are mainly used for data storage. The recording of information on a magnetic tape and/or reproducing thereof are normally performed by causing a surface of the magnetic tape (surface of a magnetic layer) to come into contact with a magnetic head (hereinafter, also simply referred to as a "head") for sliding. As the magnetic tape, a magnetic tape having a configuration in which a magnetic layer including ferromagnetic powder and a binding agent is provided on a non-magnetic support is widely used (for example, see JP2005-243162A).

SUMMARY OF THE INVENTION

In a case of reproducing information recorded on a magnetic tape, as a frequency of generation of a partial decrease in reproducing signal amplitude (referred to as "missing pulse") increases, an error rate increases and reliability of the magnetic tape decreases. Therefore, in order to provide a magnetic tape capable of being used with high reliability, it is desired to decrease a generation frequency of the missing pulse.

However, in recent years, the magnetic tape used for data storage is used in a data center in which a temperature and humidity are managed. On the other hand, in the data center, power saving is necessary for reducing the cost. For realizing the power saving, the managing conditions of the temperature and humidity of the data center can be alleviated compared to the current state, or the managing may not be necessary. However, in a case where the managing conditions of the temperature and humidity are alleviated or the managing is not performed, the magnetic tape is assumed to be used in various environments and assumed to be used in an environment of a low temperature and high humidity. However, as a result of the studies of the inventors, in a low temperature and high humidity environment, it has been determined that a frequency of generation of the missing pulse tends to increase.

Therefore, an object of the invention is to provide a magnetic tape in which a generation frequency of a missing pulse in the low temperature and high humidity environment is decreased.

According to one aspect of the invention, there is provided a magnetic tape comprising: a non-magnetic support; and a magnetic layer including ferromagnetic powder and a binding agent on the non-magnetic support, in which an absolute value $\Delta N$ of a difference between a refractive index Nxy measured regarding an in-plane direction of the magnetic layer and a refractive index Nz measured regarding a thickness direction of the magnetic layer is 0.25 to 0.40, and a logarithmic decrement acquired by a pendulum viscoelasticity test performed regarding a surface of the magnetic layer (hereinafter, also referred to as a "logarithmic decrement of the magnetic layer" or simply a "logarithmic decrement") is equal to or smaller than 0.050.

In one aspect, the difference (Nxy−Nz) between the refractive index Nxy and the refractive index Nz may be 0.25 to 0.40.

In one aspect, the logarithmic decrement may be 0.010 to 0.050.

In one aspect, the magnetic tape may further comprise a non-magnetic layer including a non-magnetic powder and a binding agent between the non-magnetic support and the magnetic layer.

In one aspect, the magnetic tape may further comprise a back coating layer including a non-magnetic powder and a binding agent on a surface of the non-magnetic support opposite to a surface provided with the magnetic layer.

According to another aspect of the invention, there is provided a magnetic recording and reproducing device comprising: the magnetic tape; and a magnetic head.

According to one aspect of the invention, it is possible to provide a magnetic tape in which a generation frequency of a missing pulse in the low temperature and high humidity environment is decreased. In addition, according to the other aspect of the invention, it is possible to provide a magnetic recording and reproducing device including the magnetic tape.

DESCRIPTION OF THE PREFERRED EMBODIMENTS

Magnetic Tape

Figure 1:
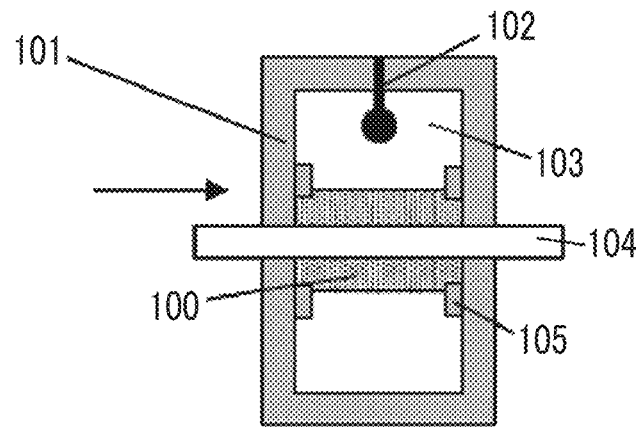
FIG. 1 is an explanatory diagram of a measurement method of a logarithmic decrement.

One aspect of the invention relates to a magnetic tape including: a non-magnetic support; and a magnetic layer including ferromagnetic powder and a binding agent on the non-magnetic support, in which an absolute value $\Delta N$ of a difference between a refractive index Nxy measured regarding an in-plane direction of the magnetic layer and a refractive index Nz measured regarding a thickness direction of the magnetic layer is 0.25 to 0.40, and a logarithmic decrement acquired by a pendulum viscoelasticity test performed regarding a surface of the magnetic layer is equal to or smaller than 0.050.

In the invention and the specification, the "surface of the magnetic layer" is identical to a surface of a magnetic tape on the magnetic layer side. In the invention and the specification, the "ferromagnetic powder" means an aggregate of a plurality of ferromagnetic particles. The "aggregate" is not only limited to an aspect in which particles configuring the aggregate directly come into contact with each other, but also includes an aspect in which a binding agent, an additive, or the like is interposed between the particles. The points described above are also applied to various powders such as non-magnetic powder of the invention and the specification, in the same manner.

Hereinafter, measurement methods of ΔN and the logarithmic decrement will be described.

In the invention and the specification, the absolute value ΔN of the difference between the refractive index Nxy measured regarding the in-plane direction of the magnetic layer and the refractive index Nz measured regarding the thickness direction of the magnetic layer is a value obtained by the following method.

The refractive index regarding each direction of the magnetic layer is obtained using a double-layer model by spectral ellipsometry. In order to obtain the refractive index of the magnetic layer using the double-layer model by spectral ellipsometry, a value of a refractive index of a portion adjacent to the magnetic layer is used. Hereinafter, an example in a case of obtaining the refractive indexes Nxy and Nz of the magnetic layer of the magnetic tape including a layer configuration in which the non-magnetic layer and the magnetic layer are laminated on the non-magnetic support in this order will be described. However, the magnetic tape according to one aspect of the invention may also be a magnetic tape having a layer configuration in which the magnetic layer is directly laminated on the non-magnetic support without the non-magnetic layer interposed therebetween. Regarding the magnetic tape having such a configuration, the refractive index regarding each direction of the magnetic layer is obtained in the same manner as the following method, using the double-layer model of the magnetic layer and the non-magnetic support. In addition, an incidence angle shown below is an incidence angle in a case where the incidence angle is 0° in a case of vertical incidence.

(1) Preparation of Sample for Measurement

Regarding the magnetic tape including a back coating layer on a surface of a non-magnetic support on a side opposite to the surface provided with a magnetic layer, the measurement is performed after removing the back coating layer of a sample for measurement cut from the magnetic tape. The removal of the back coating layer can be performed by a well-known method of dissolving of the back coating layer using a solvent or the like. As the solvent, for example, methyl ethyl ketone can be used. However, any solvent which can remove the back coating layer may be used. The surface of the non-magnetic support after removing the back coating layer is roughened by a well-known method so that the reflected light on this surface is not detected, in the measurement of ellipsometer. The roughening can be performed by a method of polishing the surface of the non-magnetic support after removing the back coating layer by using sand paper, for example. Regarding the sample for measurement cut out from the magnetic tape not including the back coating layer, the surface of the non-magnetic support on a side opposite to the surface provided with the magnetic layer is roughened.

In addition, in order to measure the refractive index of the non-magnetic layer described below, the magnetic layer is further removed and the surface of the non-magnetic layer is exposed. In order to measure the refractive index of the non-magnetic support described below, the non-magnetic layer is also further removed and the surface of the non-magnetic support on the magnetic layer side is exposed. The removal of each layer can be performed by a well-known method so as described regarding the removal of the back coating layer. A longitudinal direction described below is a direction which was a longitudinal direction of the magnetic tape, in a case where the sample for measurement is included in the magnetic tape before being cut out. This point applies to other directions described below, in the same manner.

(2) Measurement of Refractive Index of Magnetic Layer

By setting the incidence angles as 65°, 70°, and 75°, and irradiating the surface of the magnetic layer in the longitudinal direction with an incidence ray having a beam diameter of 300 μm by using the ellipsometer, Δ (phase difference of s-polarized light and p-polarized light) and ψ (amplitude ratio of s-polarized light and p-polarized light) is measured. The measurement is performed by changing a wavelength of the incidence ray by 1.5 nm in a range of 400 to 700 nm, and a measurement value at each wavelength is obtained.

The refractive index of the magnetic layer at each wavelength is obtained with a double-layer model as described below, by using the measurement values of Δ and ψ of the magnetic layer at each wavelength, the refractive index of the non-magnetic layer in each direction obtained by the following method, and the thickness of the magnetic layer.

The zeroth layer which is a substrate of the double-layer model is set as a non-magnetic layer and the first layer thereof is set as a magnetic layer. The double-layer model is created by assuming that there is no effect of rear surface reflection of the non-magnetic layer, by only considering the reflection of the interfaces of air/magnetic layer and magnetic layer/non-magnetic layer. A refractive index of the first layer which is fit to the obtained measurement value the most is obtained by fitting performed by a least squares method. The refractive index Nx of the magnetic layer in the longitudinal direction and a refractive index $Nz_1$ of the magnetic layer in the thickness direction measured by emitting the incidence ray in the longitudinal direction are obtained as values at the wavelength of 600 nm obtained from the results of the fitting.

In the same manner as described above, except that the direction of incidence of the incidence ray is set as a width direction of the magnetic tape, a refractive index Ny of the magnetic layer in the width direction and a refractive index $Nz_2$ of the magnetic layer in the thickness direction measured by emitting the incidence ray in the width direction are obtained as values at the wavelength of 600 nm obtained from the results of the fitting.

The fitting is performed by the following method.

In general, "complex refractive index n=η+iκ". Here, η is a real number of the refractive index, κ is an extinction coefficient, and i is an imaginary number. In a case where a complex dielectric constant ε=ε1+iε2(ε1 and ε2 satisfies Kramers-Kronig relation), $ε1=η^2-κ^2$, and ε2=2ηκ, the complex dielectric constant of Nx satisfies that $ε_x=ε_x1+iε_x2$, and the complex dielectric constant of $Nz_1$ satisfies that $ε_{z1}=ε_{z1}1+iε_{z1}2$, in a case of calculating the Nx and $Nz_1$.

The Nx is obtained by setting $ε_x2$ as one Gaussian, setting any point, where a peak position is 5.8 to 5.1 eV and σ is 4 to 3.5 eV, as a starting point, setting a parameter to be offset to a dielectric constant beyond a measurement wavelength range (400 to 700 nm), and performing least squares fitting with respect to the measurement value. In the same manner, $N_z1$ is obtained by setting any point of $ε_{z1}2$, where a peak position is 3.2 to 2.9 eV and σ is 1.5 to 1.2 eV, as a starting point, and setting an offset parameter, and performing least squares fitting with respect to the measurement value. Ny and $Nz_2$ are also obtained in the same manner. The refractive index Nxy measured regarding the in-plane direction of the magnetic layer is obtained as "Nxy=(Nx+Ny)/2". The refractive index Nz measured regarding the thickness direction of the magnetic layer is obtained as "Nz=($Nz_1$+$Nz_2$)/2". From the obtained Nxy and Nz, the absolute value ΔN of difference thereof is obtained.

(3) Measurement of Refractive Index of Non-Magnetic Layer

Refractive indexes of the non-magnetic layer at a wavelength of 600 nm (the refractive index in the longitudinal direction, the refractive index in the width direction, the refractive index in the thickness direction measured by emitting the incidence ray in the longitudinal direction, and the refractive index in the thickness direction measured by emitting the incidence ray in the width direction) are obtained in the same manner as in the method described above, except the following points.

The wavelength of the incidence ray is changed by 1.5 nm in the range of 250 to 700 nm.

By using a double-layer model of a non-magnetic layer and a non-magnetic support, the zeroth layer which is a substrate of the double-layer model is set as the non-magnetic support, and the first layer thereof is set as the non-magnetic layer. The double-layer model is created by assuming that there is no effect of rear surface reflection of the non-magnetic support, by only considering the reflection of the interfaces of air/non-magnetic layer and non-magnetic layer/non-magnetic support.

In the fitting, seven peaks (0.6 eV, 2.3 eV, 2.9 eV, 3.6 eV, 4.6 eV, 5.0 eV, and 6.0 eV) are assumed in the imaginary part (ε2) of the complex dielectric constant, and the parameter to be offset is set to the dielectric constant beyond the measurement wavelength range (250 to 700 nm).

(4) Measurement of Refractive Index of Non-Magnetic Support

The refractive indexes of the non-magnetic support at a wavelength of 600 nm (refractive index in the longitudinal direction, the refractive index in the width direction, the refractive index in the thickness direction measured by emitting the incidence ray in the longitudinal direction, and the refractive index in the thickness direction measured by emitting the incidence ray in the width direction) used for obtaining the refractive indexes of the non-magnetic layer by the double-layer model are obtained in the same manner as in the method described above for measuring the refractive index of the magnetic layer, except the following points.

A single-layer model with only front surface reflection is used, without using the double-layer model.

The fitting is performed by the Cauchy model ($n=A+B/\lambda^2$, n is a refractive index, A and B are respectively constants determined by fitting, and λ is a wavelength).

Next, the logarithmic decrement of the magnetic layer will be described.

In the invention and the specification, the logarithmic decrement of the magnetic layer is a value acquired by the following method.

Figure 2:
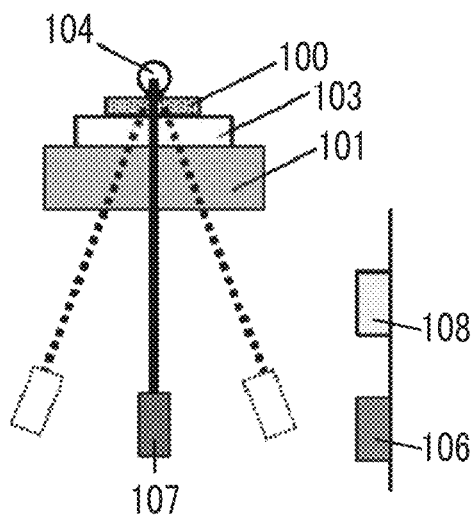
FIG. 2 is an explanatory diagram of the measurement method of the logarithmic decrement.
Figure 3:
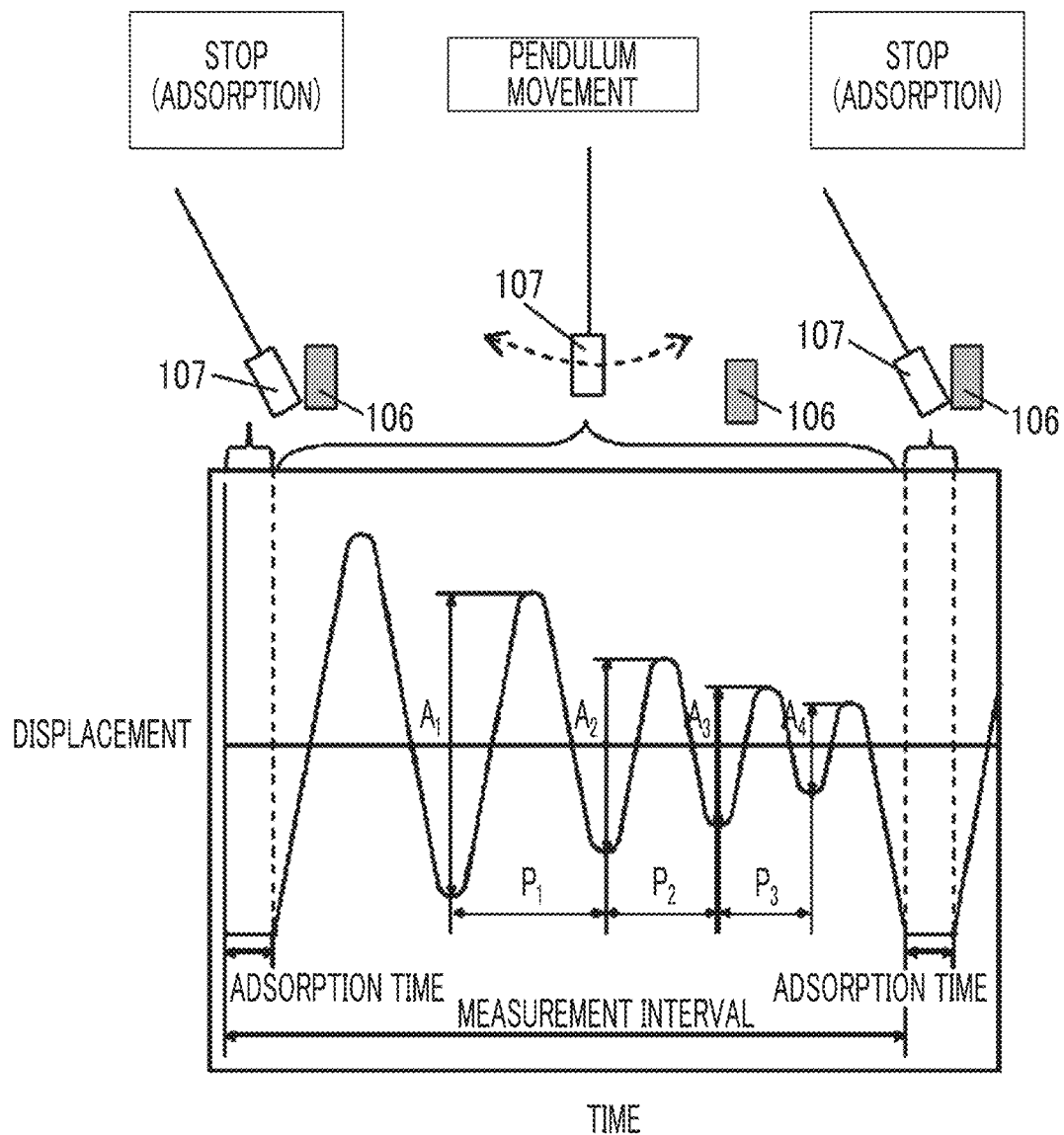
FIG. 3 is an explanatory diagram of the measurement method of the logarithmic decrement.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the magnetic layer) faces upward, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100. An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is the same direction as a longitudinal direction of a magnetic tape from which the measurement sample is cut out. In addition, as a pendulum 107 (see FIG. 2), a pendulum formed of a material having properties of being adsorbed to a magnet (for example, formed of metal or formed of an alloy) is used.

The temperature of the surface of the substrate 103 on which the measurement sample 100 is placed is set to 80° C. by increasing the temperature at a rate of temperature increase equal to or lower than 5° C./min (any rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnet 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The stop (adsorption) and the pendulum movement are repeated at a regular measurement interval, the logarithmic decrement Δ (no unit) is acquired from the following Expression by using a displacement-time curve obtained in the measurement interval after 10 minutes or longer (may be any time, as long as it is 10 minutes or longer) has elapsed, and this value is set as logarithmic decrement of the surface of the magnetic layer of the magnetic tape. The adsorption time of the first adsorption is set as 1 second or longer (may be any time, as long as it is 1 second or longer), and the interval between the adsorption stop and the adsorption start is set as 6 seconds or longer (may be any time, as long as it is 6 seconds or longer). The measurement interval is an interval of the time from the adsorption start and the next adsorption start. In addition, humidity of an environment in which the pendulum movement is performed, may be any relative humidity, as long as the relative humidity is 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and $A_n$ indicates the minimum displacement and maximum displacement of the n-th wave. In FIG. 3, an interval between the minimum displacement of the n-th wave and the next minimum displacement is shown as $P_n$ (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

The inventors have surmised as follows regarding a reason for a decrease of the generation frequency of the missing pulse in the low temperature and high humidity environment in the magnetic tape.

In a case of reproducing information recorded on the magnetic tape, in a case where the surface of the magnetic layer is chipped in the sliding of the surface of the magnetic layer and a head, the generated scraps are attached to the head and a head attached material may be generated. The inventors have surmised regarding the reason for the generation of the missing pulse in the low temperature and high humidity environment, a contact state in a case of the sliding of the surface of the magnetic layer and the head easily becomes unstable due to a tendency of an increase of a coefficient of friction during the sliding of the surface of the magnetic layer and the head in the low temperature and high humidity environment, and the reason for the unstable contact state is the generation of the head attached material.

Regarding the above-mentioned point, the inventors have thought that ΔN obtained by the method described above is a value which may be an index of a presence state of the ferromagnetic powder in a surface region of the magnetic layer. This ΔN is assumed as a value which is influenced by the effect of various factors such as a presence state of a binding agent or a density distribution of the ferromagnetic powder, in addition to the alignment state of the ferromagnetic powder in the magnetic layer. In addition, it is thought that the magnetic layer in which the ΔN is set as 0.25 to 0.40 by controlling various factors has a high hardness of the surface of the magnetic layer and the chipping thereof due to the sliding with the head hardly occurs. The inventors have surmised that, this contributes to the prevention of the generation of the head attached material due to the chipping of the surface of the magnetic layer during the sliding with the head in the low temperature and high humidity environment, and as a result, this contributes to a decrease in the generation frequency of the missing pulse in the low temperature and high humidity environment.

In addition, the inventors have surmised regarding the logarithmic decrement as follows.

It is thought that the logarithmic decrement obtained by the method described above is a value which is an index for the amount of pressure sensitive adhesive components separated from the surface of the magnetic layer, in a case where the head comes into contact with the surface of the magnetic layer and slides thereon, and interposed between the surface of the magnetic layer and the head. It is thought that as a larger amount of the pressure sensitive adhesive components are present, adhesion between the surface of the magnetic layer and the head increases, and accordingly, a contact state during the sliding between the surface of the magnetic layer and the head becomes unstable. With respect to this, it is thought that, in the magnetic tape, a state where the logarithmic decrement of the magnetic layer is equal to or smaller than 0.050, that is, a state where the amount of the pressure sensitive adhesive components is decreased contributes to smooth sliding between the surface of the magnetic layer and the head. The inventors have surmised that this contributes to stabilization of the contact state during the sliding between the surface of the magnetic layer and the head, thereby causing a decrease in generation frequency of the missing pulse in the low temperature and high humidity environment.

The details of the pressure sensitive adhesive components are not clear. The inventors have surmised that the pressure sensitive adhesive components may be derived from a resin used as a binding agent. The specific description is as follows. As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have thought that the binding agent component having a low molecular weight may be separated from the surface of the magnetic layer at the time of sliding between the head and the surface of the magnetic layer and interposed between the surface of the magnetic layer and the head. The inventors have surmised that, the binding agent component having a low molecular weight may have pressure sensitive adhesive properties and the logarithmic decrement acquired by a pendulum viscoelasticity test may be an index for the amount of binding agent components having a low molecular weight separated from the surface of the magnetic layer at the time of the sliding between the surface of the magnetic layer and the head. In one aspect, the magnetic layer is formed by applying a magnetic layer forming composition including a curing agent in addition to ferromagnetic powder and a binding agent, onto a non-magnetic support directly or with another layer interposed therebetween, and performing curing process. With the curing process here, it is possible to allow a curing reaction (crosslinking reaction) between the binding agent and the curing agent. However, although the reason thereof is not clear, the inventors have considered that the binding agent component having a low molecular weight may have poor reactivity regarding the curing reaction. Accordingly, the inventors have surmised that the binding agent component having a low molecular weight which hardly remains in the magnetic layer and is easily separated from the magnetic layer may be one of reasons for that the binding agent component having a low molecular weight is interposed between the surface of the magnetic layer and the head at the time of the sliding between the surface of the magnetic layer and the head.

However, the above descriptions are merely a surmise of the inventors and the invention is not limited thereto.

Hereinafter, the magnetic tape will be described more specifically. Hereinafter, the generation frequency of the missing pulse in the low temperature and high humidity environment is also simply referred to as the "generation frequency of the missing pulse".

Magnetic Layer

ΔN of Magnetic Layer

ΔN of the magnetic layer of the magnetic tape is 0.25 to 0.40. As described above, it is surmised that the magnetic layer having ΔN of 0.25 to 0.40 has a high hardness of the surface of the magnetic layer, and the chipping thereof due to the sliding with the head in the low temperature and high humidity environment hardly occurs. Accordingly, it is thought that, in a case of reproducing information recorded on the magnetic layer in the low temperature and high humidity environment, the chipping of the magnetic layer having ΔN in the range described above hardly occurs on the surface of the magnetic layer during the sliding of the surface of the magnetic layer and the head. It is surmised that this contributes to a decrease in the generation frequency of the missing pulse in the low temperature and high humidity environment. From a viewpoint of further decreasing the generation frequency of the missing pulse, ΔN is preferably 0.25 to 0.35. A specific aspect of means for adjusting ΔN will be described later.

ΔN is an absolute value of a difference between Nxy and Nz. Nxy is a refractive index measured regarding the in-plane direction of the magnetic layer and Nz is a refractive index measured regarding the thickness direction of the magnetic layer. In one aspect, a relation of Nxy>Nz can be satisfied, and in the other aspect, Nxy<Nz can be satisfied. From a viewpoint of electromagnetic conversion characteristics of the magnetic tape, a relationship of Nxy>Nz is preferable, and therefore, the difference between the Nxy and Nz (Nxy−Nz) is preferably 0.25 to 0.40 and more preferably 0.25 to 0.35.

Various means for adjusting ΔN described above will be described later.

Logarithmic Decrement

The logarithmic decrement acquired by a pendulum viscoelasticity test performed regarding the surface of the magnetic layer of the magnetic tape is equal to or smaller than 0.050, from a viewpoint of decreasing the generation frequency of the missing pulse in the low temperature and high humidity environment. From a viewpoint of further decreasing the generation frequency of the missing pulse, the logarithmic decrement is preferably equal to or smaller than 0.048, more preferably equal to or smaller than 0.045, and even more preferably equal to or smaller than 0.040. Meanwhile, from a viewpoint of decreasing the generation frequency of the missing pulse, it is preferable that the logarithmic decrement is low, and thus, a lower limit value is not particularly limited. The logarithmic decrement can be, for example, equal to or greater than 0.010 or equal to or greater than 0.015. However, the logarithmic decrement may be smaller than the exemplified value. A specific aspect of means for adjusting the logarithmic decrement will be described later.

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size equal to or smaller than 50 nm is preferably used as the ferromagnetic powder. Meanwhile, the average particle size of the ferromagnetic powder is preferably equal to or greater than 5 nm, and more preferably equal to or greater than 10 nm, from a viewpoint of stability of magnetization.

As a preferred specific example of the ferromagnetic powder, ferromagnetic hexagonal ferrite powder can be used. The ferromagnetic hexagonal ferrite powder can be ferromagnetic hexagonal barium ferrite powder, ferromagnetic hexagonal strontium ferrite powder, and the like. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

As a preferred specific example of the ferromagnetic powder, ε-iron oxide powder can also be used. As a method for producing ε-iron oxide powder, a method for producing ε-iron oxide powder from goethite and a reverse micelle method has been known. Both of the above-described production methods have been publicly known. Moreover, J. Jpn. Soc. Powder Metallurgy Vol. 61 Supplement, No. S1, pp. S280-S284 and J. Mater. Chem. C, 2013, 1, pp. 5200-5206 can be referred to about a method for producing ε-iron oxide powder where some of Fe are substituted with substitutional atoms such as Ga, Co, Ti, Al, and Rh, for example. The method for producing ε-iron oxide powder which can be used as ferromagnetic powder in the magnetic layer, however, is not limited to these methods.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. A value regarding a size of powder such as the average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic recording medium in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

In one aspect, the shape of the ferromagnetic particles configuring the ferromagnetic powder included in the magnetic layer can be a plate shape. Hereinafter, the ferromagnetic powder including the plate-shaped ferromagnetic particles is referred to as a plate-shaped ferromagnetic powder. An average plate ratio of the plate-shaped ferromagnetic powder can be preferably 2.5 to 5.0. The average plate ratio is an arithmetical mean of (maximum long diameter/thickness or height) in a case of the definition (2). As the average plate ratio increases, uniformity of the alignment state of the ferromagnetic particles configuring the plate-shaped ferromagnetic powder tends to easily increase by the alignment process, and the value of ΔN tends to increase.

As an index for a particle size of the ferromagnetic powder, an activation volume can also be used. The "activation volume" is a unit of magnetization reversal. Regarding the activation volume described in the invention and the specification, magnetic field sweep rates of a coercivity Hc measurement part at time points of 3 minutes and 30 minutes are measured by using an oscillation sample type magnetic-flux meter in an environment of an atmosphere temperature of 23° C.±1° C., and the activation volume is a value acquired from the following relational expression of Hc and an activation volume V. The activation volume shown in examples which will be described later is a value obtained by performing measurement using an oscillation sample type magnetic-flux meter (manufactured by Toei Industry Co., Ltd.).

$$Hc=2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

From a viewpoint of improving the recording density, the activation volume of the ferromagnetic powder is preferably equal to or smaller than 2,500 nm$^3$, more preferably equal to or smaller than 2,300 nm$^3$, and even more preferably equal to or smaller than 2,000 nm$^3$. Meanwhile, from a viewpoint of stability of magnetization, the activation volume of the ferromagnetic powder is, for example, preferably equal to or greater than 800 nm$^3$, more preferably equal to or greater than 1,000 nm$^3$, and even more preferably equal to or greater than 1,200 nm$^3$.

The content (filling percentage) of the ferromagnetic powder of the magnetic layer is preferably 50% to 90% by mass and more preferably 60% to 90% by mass. The components other than the ferromagnetic powder of the magnetic layer are at least one or more components selected from the group consisting of fatty acid and fatty acid amide, and a binding agent, and one or more kinds of additives may be randomly included. A high filling percentage of the ferromagnetic powder in the magnetic layer is preferable from a viewpoint of improvement of recording density.

Binding Agent and Curing Agent

The magnetic tape is a coating type magnetic tape and includes a binding agent in the magnetic layer. The binding agent is one or more kinds of resin. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In one aspect, as the binding agent, a binding agent including an acidic group can be used. The acidic group of the invention and the specification is used as a meaning including a state of a group capable of emitting $H^+$ in water or a solvent including water (aqueous solvent) to dissociate anions and salt thereof. Specific examples of the acidic group include a sulfonic acid group, a sulfuric acid group, a carboxy group, a phosphoric acid group, and salt thereof. For example, salt of sulfonic acid group ($—SO_3H$) is represented by $—SO_3M$, and M represents a group representing an atom (for example, alkali metal atom or the like) which may be cations in water or in an aqueous solvent. The same applies to aspects of salt of various groups described above. As an example of the binding agent including the acidic group, a resin including at least one kind of acidic group selected from the group consisting of a sulfonic acid group and salt thereof (for example, a polyurethane resin or a vinyl chloride resin) can be used. However, the resin included in the magnetic layer is not limited to these resins. In addition, in the binding agent including the acidic group, a content of the acidic group can be, for example, 20 to 500 eq/ton. eq indicates equivalent and SI unit is a unit not convertible. The content of various functional groups such as the acidic group included in the resin can be obtained by a well-known method in accordance with the kind of the functional group. As the binding agent having a great content of the acidic group is used, the value of $\Delta N$ tends to increase. The amount of the binding agent used in a magnetic layer forming composition can be, for example, 1.0 to 30.0 parts by mass, and preferably 1.0 to 20.0 parts by mass with respect to 100.0 parts by mass of the ferromagnetic powder. As the amount of the binding agent used with respect to the ferromagnetic powder increases, the value of $\Delta N$ tends to increase.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes ferromagnetic powder and a binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used in the magnetic layer including the abrasive, a dispersing agent disclosed in paragraphs 0012 to 0022 of JP2013-131285A can be used as a dispersing agent for improving dispersibility of the abrasive. For example, for the lubricant, a description disclosed in paragraphs 0030 to 0033, 0035, and 0036 of JP2016-126817A can be referred to. The non-magnetic layer may include the lubricant. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to.

The magnetic layer described above can be provided on the surface of the non-magnetic support directly or indirectly through the non-magnetic layer.

Non-Magnetic Layer

Next, the non-magnetic layer will be described.

The magnetic tape may include a magnetic layer directly on the surface of the non-magnetic support or may include a non-magnetic layer including the non-magnetic powder and the binding agent between the non-magnetic support and the magnetic layer. The non-magnetic powder included in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0036 to 0039 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support (hereinafter, also simply referred to as a "support") will be described.

As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic tape can also include a back coating layer including a non-magnetic powder and a binding agent on a surface of the non-magnetic support opposite to the surface provided with the magnetic layer. The back coating layer preferably includes any one or both of carbon black and inorganic powder. In regards to the binding agent included in the back coating layer and various additives which can be randomly included therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

The thicknesses of the non-magnetic support and each layer of the magnetic tape will be described below.

The thickness of the non-magnetic support is, for example, 3.0 to 80.0 μm, preferably 3.0 to 50.0 μm, and more preferably 3.0 to 10.0 μm.

A thickness of the magnetic layer can be optimized according to a saturation magnetization of a magnetic head used, a head gap length, a recording signal band, and the like. The thickness of the magnetic layer is normally 10 nm to 100 nm, and is preferably 20 to 90 nm and more preferably 30 to 70 nm, from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and preferably 0.1 to 1.0 μm.

A thickness of the back coating layer is preferably equal to or smaller than 0.9 μm and even more preferably 0.1 to 0.7 μm.

The thicknesses of various layers and the non-magnetic support are obtained by exposing a cross section of the magnetic tape in a thickness direction by a well-known method of ion beams or microtome, and observing the exposed cross section with a scanning transmission electron microscope (STEM). For the specific examples of the measurement method of the thickness, a description disclosed regarding the measurement method of the thickness in examples which will be described later can be referred to.

Manufacturing Step

Preparation of Each Layer Forming Composition

Steps of preparing the composition for forming the magnetic layer, the non-magnetic layer, or the back coating layer generally include at least a kneading step, a dispersing step, and a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic tape, a well-known manufacturing technology of the related art can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. In addition, the ferromagnetic powder and the abrasive can also be dispersed separately. The separate dispersion is specifically a method of preparing a magnetic layer forming composition through a step of mixing an abrasive solution including an abrasive and a solvent (here, ferromagnetic powder is not substantially included) with a magnetic liquid including the ferromagnetic powder, a solvent, and a binding agent. The expression "ferromagnetic powder is not substantially included" means that the ferromagnetic powder is not added as a constituent component of the abrasive solution, and a small amount of the ferromagnetic powder mixed as impurities without any intention is allowed. Regarding $\Delta N$, as a period of the dispersion time of the magnetic liquid increases, the value of $\Delta N$ tends to increase. This is thought that, as a period of the dispersion time of the magnetic liquid increases, the dispersibility of the ferromagnetic powder in the coating layer of the magnetic layer forming composition increases, and the uniformity of the alignment state of the ferromagnetic particles configuring the ferromagnetic powder by the alignment process tends to easily increase. In addition, as the period of the dispersion time in a case of mixing and dispersing various components of the non-magnetic layer forming composition increases, the value of $\Delta N$ tends to increase. The dispersion time of the magnetic liquid and the dispersion time of the non-magnetic layer forming composition may be set so that $\Delta N$ of 0.25 to 0.40 can be realized.

In any stage of preparing each layer forming composition, the filtering may be performed by a well-known method. The filtering can be performed by using a filter, for example. As the filter used in the filtering, a filter having a hole diameter of 0.01 to 3 µm (for example, filter made of glass fiber or filter made of polypropylene) can be used, for example.

Coating Step

The non-magnetic layer and the magnetic layer can be formed by performing multilayer coating with the non-magnetic layer forming composition and the magnetic layer forming composition in order or at the same time. The back coating layer can be formed by applying the back coating layer forming composition onto the surface of the non-magnetic support opposite to the surface provided with the non-magnetic layer and the magnetic layer (or non-magnetic layer and/or the magnetic layer is to be provided). In addition, the coating step for forming each layer can be also performed by being divided into two or more steps. For example, in one aspect, the magnetic layer forming composition can be applied in two or more steps. In this case, a drying process may be performed or may not be performed during the coating steps of two stages. In addition, the alignment process may be performed or may not be performed during the coating steps of two stages. For details of the coating for forming each layer, a description disclosed in a paragraph 0066 of JP2010-231843A can be referred to. In addition, for the drying step after applying the each layer forming composition, a well-known technology can be applied. Regarding the magnetic layer forming composition, as a drying temperature of a coating layer which is formed by applying the magnetic layer forming composition (hereinafter, also referred to as a "coating layer of the magnetic layer forming composition" or simply a "coating layer") decreases, the value of $\Delta N$ tends to increase. The drying temperature can be an atmosphere temperature for performing the drying step, for example, and may be set so that $\Delta N$ of 0.25 to 0.40 can be realized.

Other Steps

For various other steps for manufacturing the magnetic tape, a well-known technology can be applied. For details of the various steps, descriptions disclosed in paragraphs 0067 to 0070 of JP2010-231843A can be referred to, for example.

For example, it is preferable to perform the alignment process with respect to the coating layer of the magnetic layer forming composition while the coating layer is wet. From a viewpoint of ease of exhibiting of $\Delta N$ of 0.25 to 0.40, the alignment process is preferably performed by disposing a magnet so that a magnetic field is vertically applied to the surface of the coating layer of the magnetic layer forming composition (that is, homeotropic alignment process). The strength of the magnetic field during the alignment process may be set so that $\Delta N$ of 0.25 to 0.40 can be realized. In addition, in a case of performing the coating step of the magnetic layer forming composition by the coating steps of two or more stages, it is preferable to perform the alignment process at least after the final coating step, and it is more preferable to perform the homeotropic alignment process. For example, in a case of forming the magnetic layer by the coating steps of two stages, the drying step is performed without performing the alignment process after the first coating step, and then, the alignment process can be performed with respect to the formed coating layer in the second coating step.

In addition, it is preferable to perform the calendar process in any stage after drying the coating layer of the magnetic layer forming composition. For the conditions of the calendar process, a description disclosed in a paragraph 0026 of JP2010-231843A can be referred to. As the calendar temperature (surface temperature of the calendar roll) increases, the value of $\Delta N$ tends to increase. The calendar temperature may be set so that $\Delta N$ of 0.25 to 0.40 can be realized.

One Aspect of Preferred Manufacturing Method

In a preferred aspect, a magnetic layer can be formed through a magnetic layer forming step including a coating step of applying a magnetic layer forming composition including ferromagnetic powder, a binding agent, a curing agent, and a solvent onto a non-magnetic support directly or with a non-magnetic layer interposed therebetween, to form a coating layer, a heating and drying step of drying the coating layer by a heating process, and a curing step of performing a curing process with respect to the coating layer. The magnetic layer forming step preferably includes a cooling step of cooling the coating layer between the coating step and the heating and drying step, and more preferably includes a burnishing treatment step of performing a burnishing treatment with respect to the surface of the coating layer between the heating and drying step and the curing step.

It is thought that it is preferable that the cooling step and the burnishing treatment step in the magnetic layer forming step, in order to set the logarithmic decrement to be equal to or smaller than 0.050. More specific description is as follows.

It is surmised that performing the cooling step of cooling the coating layer between the coating step and the heating and drying step contributes to causing pressure sensitive adhesive component described above is localized in the surface and/or a surface layer part in the vicinity of the surface of the coating layer. It is thought that this is because the pressure sensitive adhesive component at the time of solvent volatilization in the heating and drying step is easily moved to the surface and/or the surface layer part of the coating layer, by cooling the coating layer of the magnetic layer forming composition before the heating and drying step. However, the reason thereof is not clear. It is thought that the pressure sensitive adhesive component can be removed by performing the burnishing treatment with respect to the surface of the coating layer in which the pressure sensitive adhesive component is localized on the surface and/or surface layer part. It is surmised that performing the curing step after removing the pressure sensitive adhesive component contributes to setting the logarithmic decrement to be equal to or smaller than 0.050. However, this is merely a surmise, and the invention is not limited thereto.

As described above, multilayer coating of the magnetic layer forming composition can be performed with the non-magnetic layer forming composition in order or at the same time. In a preferred aspect, the magnetic tape can be manufactured by successive multilayer coating. A manufacturing step including the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

Hereinafter, a specific aspect of the manufacturing method will be described with reference to FIG. 4. However, the invention is not limited to the following specific aspect. Hereinafter, the coating layer of the magnetic layer forming composition before performing the curing process may be referred to as the magnetic layer. The same applies to other layers.

Figure 4:
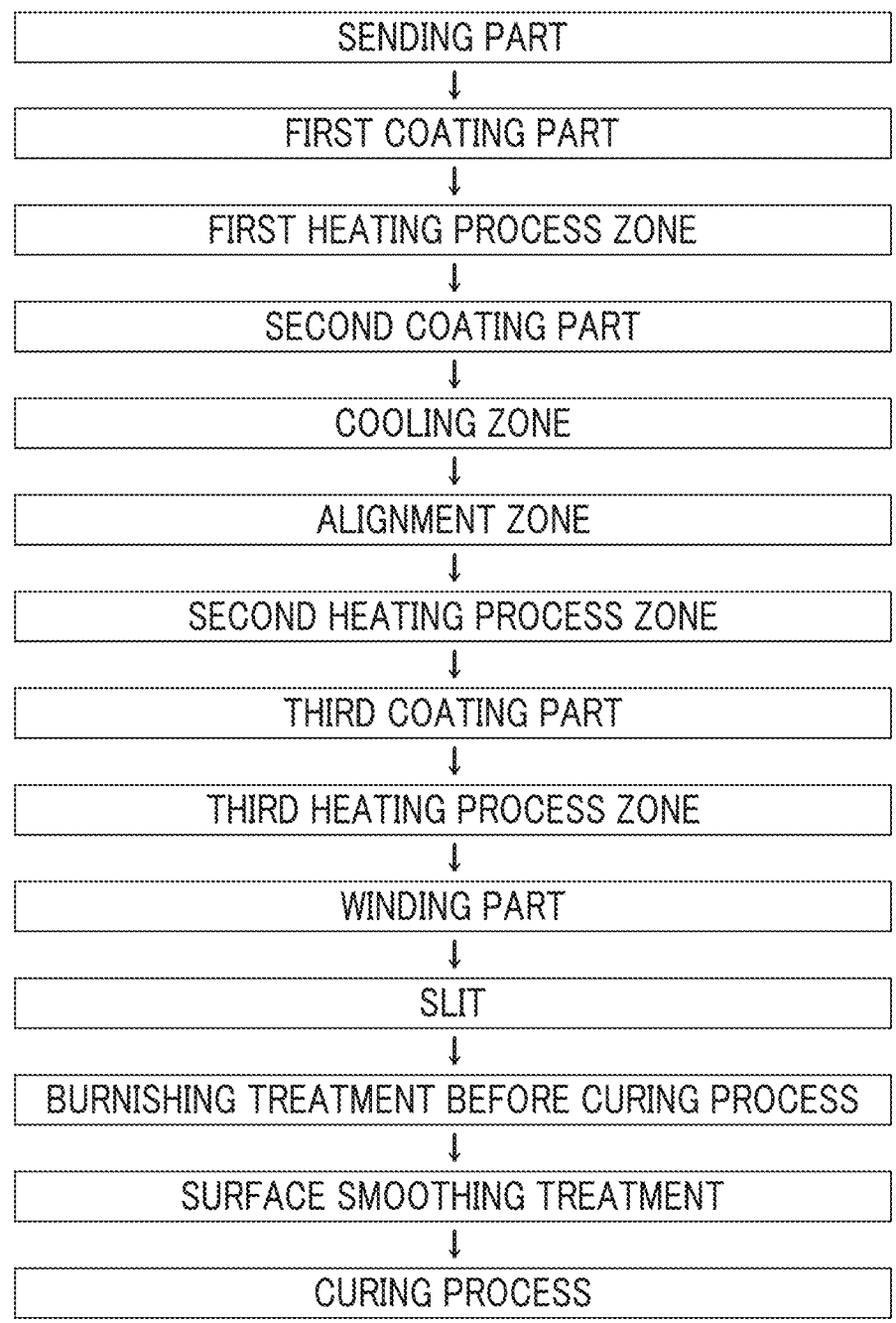
FIG. 4 shows an example (schematic step view) of a specific aspect of a magnetic tape manufacturing step.

FIG. 4 is a schematic step view showing a specific aspect of a step of manufacturing the magnetic tape including a non-magnetic layer and a magnetic layer in this order on one surface of a non-magnetic support and including a back coating layer on the other surface thereof. In the aspect shown in FIG. 4, an operation of sending a non-magnetic support (elongated film) from a sending part and winding the non-magnetic support around a winding part is continuously performed, and various processes of coating, drying, and alignment are performed in each part or each zone shown in FIG. 4, and thus, it is possible to sequentially form a non-magnetic layer and a magnetic layer on one surface of the running non-magnetic support by multilayer coating and to form a back coating layer on the other surface thereof. Such a manufacturing method can be set to be identical to the manufacturing method normally performed for manufacturing a coating type magnetic tape, except for including a cooling zone in the magnetic layer forming step and including the burnishing treatment step before the curing process.

The non-magnetic layer forming composition is applied onto the non-magnetic support sent from the sending part in a first coating part (coating step of non-magnetic layer forming composition).

After the coating step, in a first heating process zone, the coating layer of the non-magnetic layer forming composition formed in the coating step is heated after to dry the coating layer (heating and drying step). The heating and drying step can be performed by causing the non-magnetic support including the coating layer of the non-magnetic layer forming composition to pass through the heated atmosphere. An atmosphere temperature of the heated atmosphere here can be, for example, approximately 40° C. to 140° C. Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After the coating step, a coating layer of the magnetic layer forming composition formed in the coating step is cooled in a cooling zone (cooling step). For example, it is possible to perform the cooling step by allowing the non-magnetic support on which the coating layer is formed on the non-magnetic layer to pass through a cooling atmosphere. An atmosphere temperature of the cooling atmosphere is preferably −10° C. to 0° C. and more preferably −5° C. to 0° C. The time for performing the cooling step (for example, time while a random part of the coating layer is delivered to and sent from the cooling zone (hereinafter, also referred to as a "staying time")) is not particularly limited. In a case where the staying time is long, the logarithmic decrement tends to be decreased. Thus, the staying time is preferably adjusted by performing preliminary experiment if necessary, so that the logarithmic decrement equal to or smaller than 0.050 is realized. In the cooling step, cooled air may blow to the surface of the coating layer.

After that, in the aspect of performing the alignment process, while the coating layer of the magnetic layer forming composition is wet, an alignment process of the ferromagnetic powder in the coating layer is performed in an alignment zone. Regarding the alignment process, the above description can also be referred to.

The coating layer after the alignment process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By doing so, it is possible to obtain the magnetic tape including the magnetic layer on the non-magnetic layer on one surface of the non-magnetic support and the back coating layer on the other surface thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the magnetic layer, before performing the curing process (heating and light irradiation) in accordance with the types of the curing agent included in the magnetic layer (burnishing treatment step between heating and drying step and curing step). The inventors have surmised that removing the pressure sensitive adhesive component transitioned to the surface and/or the surface layer part of the magnetic layer cooled in the cooling zone by the burnishing treatment contributes to setting the logarithmic decrement to be equal to or smaller than 0.050. However, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.050 by performing the burnishing treatment in the stage described above.

The burnishing treatment can be preferably performed by performing one or both of rubbing of the surface of the layer of the treatment target by a polishing tape (polishing) and rubbing of the surface of the layer of the treatment target by a grinding tool (grinding). As the polishing tape, a commercially available product may be used and a polishing tape manufactured by a well-known method may be used. As the grinding tool, a well-known blade such as a fixed blade, a diamond wheel, or a rotary blade, or a grinding wheel can be used. In addition, a wiping treatment of wiping the surface of the layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-052544A (JP-H06-

052544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the magnetic layer. In the aspect shown in FIG. 4, the magnetic layer is subjected to the surface smoothing treatment, after the burnishing treatment and before the curing process. The surface smoothing treatment is preferably performed by a calendar process.

After that, the curing process according to the type of the curing agent included in this layer is performed with respect to the magnetic layer (curing step). The curing process can be performed by the process according to the type of the curing agent included in the coating layer, such as a heating process or light irradiation. The curing process conditions are not particularly limited, and the curing process conditions may be suitably set in accordance with the list of the magnetic layer forming composition, the type of the curing agent, and the thickness of the magnetic layer. For example, in a case where the magnetic layer is formed by using the magnetic layer forming composition including polyisocyanate as the curing agent, the curing process is preferably the heating process. In a case where the curing agent is included in a layer other than the magnetic layer, a curing reaction of the layer can also be promoted by the curing process here. Alternatively, the curing step may be separately provided. After the curing step, the burnishing treatment may be further performed.

As described above, it is possible to obtain the magnetic tape according to one aspect of the invention. However, the manufacturing method described above is merely an example, each value can be controlled to be in respective ranges described above by any means capable of adjusting ΔN and the logarithmic decrement, and such an aspect is also included in the invention. The magnetic tape is normally accommodated in a magnetic tape cartridge and the magnetic tape cartridge is mounted on a magnetic recording and reproducing device. In a case of reproducing information recorded on the magnetic tape in the magnetic recording and reproducing device in the low temperature and high humidity environment, it is possible to decrease the generation frequency of the missing pulse, in a case of using the magnetic tape according to one aspect of the invention.

In the magnetic tape thus prepared, a servo pattern may be formed by a known method, in order to allow control of tracking of a magnetic head and control of the running speed of the magnetic recording medium to be performed in the magnetic recording and reproducing device. The "formation of a servo pattern" can also be referred to as "recording of a servo signal". Formation of the servo pattern in a magnetic tape will be described below, as an example.

The servo pattern is generally recorded along the longitudinal direction of the magnetic tape. Examples of control (servo control) systems utilizing servo signals include timing-based servo (TBS), amplitude servo, and frequency servo.

As shown in European Computer Manufacturers Association (ECMA)-319, a timing-based servo technique has been employed in a magnetic tape (generally referred to as "LTO tape") in accordance with Linear Tape-Open (LTO) specifications. In this timing-based servo technique, the servo patterns are configured of consecutive alignment of a plurality of pairs of magnetic stripes (also referred to as "servo stripes"), in each pair of which magnetic stripes are not parallel with each other, in the longitudinal direction of the magnetic tape. The reason why the servo signal is configured of pairs of magnetic stripes, in each pair of which magnetic stripes are not parallel with each other, is to teach a passing position to a servo signal reading element passing over the servo pattern. Specifically, the pairs of magnetic stripes are formed so that the intervals consecutively change along the width direction of the magnetic tape, and relative positions of the servo pattern and the servo signal reading element can be determined by reading the intervals with the servo signal reading element. The information on this relative positions enable the data track to be tracked. Thus, a plurality of servo tracks are generally set over the servo signal along the width direction of the magnetic tape.

The servo band is configured of servo signals continuously aligned in the longitudinal direction of the magnetic tape. A plurality of the servo bands are generally provided in the magnetic tape. For example, in an LTO tape, the number of servo bands is five. A region sandwiched between the adjacent two servo bands is referred to as a data band. The data band is configured of a plurality of data tracks, and data tracks corresponds to respective servo tracks.

In one aspect, information on the number of servo bands (also referred to as information on a "servo band identification (ID)" or a "unique data band identification method (UDIM)") is embedded in each servo band as shown in Japanese Patent Application Publication No. 2004-318983. This servo band ID is recorded shiftedly such that the position of a specific pair of servo stripes, among a plurality of servo stripes present in a servo band, should shift in the longitudinal direction of the magnetic tape. Specifically, the degree of shifting the specific pair of servo stripes among the plurality of pairs of servo stripes is changed by each servo band. Accordingly, the recorded servo band ID is unique by each servo band, and the servo band is uniquely specified by reading one servo band with the servo signal reading element.

As another method for uniquely specifying a servo band, a method using a staggered technique as shown in ECMA-319 can be applied. In this staggered technique, a group of a plurality of pairs of magnetic stripes (servo stripes), in each pair of which magnetic stripes are not parallel with each other and which are placed consecutively in the longitudinal direction of the magnetic tape, are shiftedly recorded by each servo band in the longitudinal direction of the magnetic tape. A combination of ways of shifting for each adjacent servo bands is unique in the entire magnetic tape. Accordingly, when a servo pattern is read with two servo signal reading elements, the servo band can be uniquely specified.

Information indicating a position in the longitudinal direction of the magnetic tape (also referred to as "longitudinal position (LPOS) information") is also generally embedded in each servo band as shown in ECMA-319. This LPOS information is also recorded by shifting the position of the pair of servo stripes in the longitudinal direction of the magnetic tape. Unlike the UDIM information, the same signal is recorded in each servo band in the case of LPOS information.

Other information different from UDIM information and LPOS information as mentioned above can also be embedded in the servo band. In this case, the information to be embedded may be different by each servo band like the UDIM information or may be the same by each servo band like the LPOS information.

As a method for embedding information in a servo band, a method other than the above-described method may also be employed. For example, among a group of pairs of servo stripes, a predetermined pair of servo stripes is thinned out to record a predetermined code.

A head for forming a servo pattern is referred to as a servo write head. The servo write head has the same number of pairs of gaps corresponding to the respective pairs of magnetic stripes as the number of servo bands. Generally, a core and a coil are connected to each pair of gaps, and a magnetic field generated in the core by suppling a current pulse to the coil can generate a leakage magnetic field to the pair of gaps. When a servo pattern is formed, a magnetic pattern corresponding to a pair of gaps can be transferred to the magnetic tape by inputting a current pulse while causing a magnetic tape to run over the servo write head, to form a servo pattern. Thus, the servo pattern can be formed. The width of each gap can be set as appropriate according to the density of the servo pattern to be formed. The width of each gap can be set to, for example, 1 μm or less, 1 to 10 μm, or 10 μm or larger.

Before forming a servo pattern on the magnetic tape, the magnetic tape is generally subjected to a demagnetization (erasing) treatment. This erasing treatment may be performed by adding a uniform magnetic field to the magnetic tape using a direct current magnet or an alternate current magnet. The erasing treatment includes direct current (DC) erasing and an alternating current (AC) erasing. The AC erasing is performed by gradually reducing the intensity of the magnetic field while inverting the direction of the magnetic field applied to the magnetic tape. In contrast, the DC erasing is performed by adding a one-direction magnetic field to the magnetic tape. The DC erasing further includes two methods. The first method is horizontal DC erasing of applying a one-direction magnetic field along the longitudinal direction of the magnetic field. The second method is a vertical DC erasing of applying a one-direction magnetic field along the thickness direction of the magnetic tape. The erasing treatment may be applied to the entire magnetic tape of the magnetic tape, or may be applied to each servo band of the magnetic tape.

The direction of the magnetic field of the servo pattern to be formed is determined according to the direction of the erasing. For example, when the magnetic tape has been subjected to the horizontal DC erasing, the servo pattern is formed so that the direction of the magnetic field becomes reverse to the direction of the erasing. Accordingly, the output of the servo signal, which can be yielded by reading the servo pattern, can be increased. As shown in Japanese Patent Application Publication No. 2012-53940, when a magnetic pattern is transferred to the magnetic tape which has been subjected to the vertical DC erasing using the gaps, the servo signal, which has been yielded by reading the servo pattern thus formed, has a unipolar pulse shape. In contrast, when a magnetic pattern is transferred to the magnetic tape which has been subjected to the parallel DC erasing, the servo signal, which has been yielded by reading the servo pattern thus formed, has a bipolar pulse shape.

Magnetic Recording and Reproducing Device

Another aspect of the invention relates to a magnetic recording and reproducing device including the magnetic tape and a magnetic head.

In the invention and the specification, the "magnetic recording and reproducing device" means a device capable of performing at least one of the recording of information on the magnetic tape or the reproducing of information recorded on the magnetic tape. Such a device is generally called a drive. The magnetic head included in the magnetic recording and reproducing device can be a recording head capable of performing the recording of information on the magnetic tape, and can also be a reproducing head capable of performing the reproducing of information recorded on the magnetic tape. In addition, in one aspect, the magnetic recording and reproducing device can include both of a recording head and a reproducing head as separate magnetic heads. In another aspect, the magnetic head included in the magnetic recording and reproducing device can also have a configuration of comprising both of a recording element and a reproducing element in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) comprising a servo pattern reading element may be included in the magnetic recording and reproducing device.

In the magnetic recording and reproducing device, the recording of information on the magnetic tape and the reproducing of information recorded on the magnetic tape can be performed by bringing the surface of the magnetic layer of the magnetic tape into contact with the magnetic head and sliding. The magnetic recording and reproducing device may include the magnetic tape according to one aspect of the invention, and well-known technologies can be applied for the other configurations.

The magnetic recording and reproducing device includes the magnetic tape according to one aspect of the invention. Therefore, it is possible to decrease the generation frequency of the missing pulse in a case of reproducing information recorded on the magnetic tape in the low temperature and high humidity environment. In addition, even in a case where the surface of the magnetic layer and the head slide on each other for recording information on the magnetic tape in the low temperature and high humidity environment, it is possible to prevent the unstable contact state of the surface of the magnetic layer and the head due to the head attached material caused by the chipping of the surface of the magnetic layer.

EXAMPLES

Hereinafter, the invention will be described with reference to examples. However, the invention is not limited to aspects shown in the examples. "Parts" and "%" in the following description are based on mass.

Example 1

Preparation of Abrasive Solution 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 ($SO_3Na$ group: 0.08 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

Preparation of Magnetic Layer Forming Composition

Magnetic Liquid

Plate-shaped ferromagnetic hexagonal barium ferrite powder: 100.0 parts
(Activation volume: 1600 $nm^3$, average plate ratio: 3.5)

$SO_3Na$ group-containing polyurethane resin: see Table 1
(Weight-average molecular weight: 70,000, $SO_3Na$ group: see Table 1)

Cyclohexanone: 150.0 parts

Methyl ethyl ketone: 150.0 parts

Abrasive Solution

Alumina dispersion prepared as described above: 6.0 parts

Silica Sol (projection forming agent liquid)

Colloidal silica (Average particle size: 100 nm): 2.0 parts

Methyl ethyl ketone: 1.4 parts

Other Components

Stearic acid: 2.0 parts

Butyl stearate: 2.0 parts

Polyisocyanate (CORONATE (registered trademark) manufactured by Tosoh Corporation): 2.5 parts Finishing Additive Solvent Cyclohexanone: 200.0 parts Methyl ethyl ketone: 200.0 parts Preparation Method The magnetic liquid was prepared by beads-dispersing of various components of the magnetic liquid described above by using beads as the dispersion medium in a batch type vertical sand mill. The bead dispersion was performed using zirconia beads (bead diameter: see Table 1) as the beads for the time shown in Table 1 (magnetic liquid bead dispersion time).

The magnetic liquid obtained as described above, the abrasive solution, silica sol, other components, and a finishing additive solvent were mixed with each other and beads-dispersed for 5 minutes, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

Preparation of Non-Magnetic Layer Forming Composition

Each component among various components of the non-magnetic layer forming composition shown below excluding stearic acid, cyclohexanone, and methyl ethyl ketone was beads-dispersed (dispersion medium: zirconia beads (bead diameter: 0.1 mm), dispersion time: see Table 1) by using a batch type vertical sand mill to obtain a dispersion liquid. After that, the remaining components were added into the obtained dispersion liquid and stirred with a dissolver. Then, the obtained dispersion liquid was filtered with a filter (hole diameter: 0.5 μm) and a non-magnetic layer forming composition was prepared.

Non-magnetic inorganic powder: α-iron oxide: 100.0 parts
(Average particle size: 10 nm, BET specific surface area: 75 $m^2/g$)

Carbon black: 25.0 parts
(Average particle size: 20 nm)

A $SO_3Na$ group-containing polyurethane resin: 18.0 parts
(Weight-average molecular weight: 70,000, content of $SO_3Na$ group: 0.2 meq/g)

Stearic acid: 1.0 parts

Cyclohexanone: 300.0 parts

Methyl ethyl ketone: 300.0 parts

Preparation of Back Coating Layer Forming Composition

Each component among various components of the back coating layer forming composition shown below excluding stearic acid, butyl stearate, polyisocyanate, and cyclohexanone was kneaded and diluted by an open kneader, and a mixed solution was obtained. After that, the obtained mixed solution was subjected to a dispersion process of 12 passes, with a transverse beads mill and zirconia beads having a bead diameter of 1.0 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. Then, the obtained dispersion liquid was filtered with a filter (hole diameter: 1.0 μm) and a back coating layer forming composition was prepared.

Non-magnetic inorganic powder: α-iron oxide: 80.0 parts

Average particle size (average long axis length): 0.15 μm

Average acicular ratio: 7

BET specific surface area: 52 $m^2/g$

Carbon black: 20.0 parts

Average particle size: 20 nm

A vinyl chloride copolymer: 13.0 parts

A sulfonic acid salt group-containing polyurethane resin: 6.0 parts

Phenylphosphonic acid: 3.0 parts

Methyl ethyl ketone: 155.0 parts

Stearic acid: 3.0 parts

Butyl stearate: 3.0 parts

Polyisocyanate: 5.0 parts

Cyclohexanone: 355.0 parts

Manufacturing of Magnetic Tape

A magnetic tape was manufactured by the specific aspect shown in FIG. 4. The magnetic tape was specifically manufactured as follows.

A support made of polyethylene naphthalate having a thickness of 5.0 μm was sent from the sending part, and the non-magnetic layer forming composition was applied to one surface thereof so that the thickness after the drying becomes 0.7 μm in the first coating part, and dried in the first heating process zone (atmosphere temperature of 100° C.) to form a non-magnetic layer.

After that, the magnetic layer forming composition was applied on the non-magnetic layer so that the thickness after the drying becomes 50 nm in the second coating part to form the coating layer. The cooling step was performed by passing the formed coating layer through the cooling zone in which the atmosphere temperature is adjusted to 0° C. for the staying time shown in Table 1 while the coating layer is wet. Then, a homeotropic alignment process was performed by applying a magnetic field having a strength shown in Table 1 in a vertical direction with respect to the surface of the coating layer of the magnetic layer forming composition in the alignment zone, the coating layer was dried in the second heating process zone (atmosphere temperature: magnetic layer drying temperature in Table 1) to form the magnetic layer.

After that, in the third coating part, the back coating layer forming composition was applied to the surface of the support made of polyethylene naphthalate on a side opposite to the surface where the non-magnetic layer and the magnetic layer are formed, so that the thickness after the drying becomes 0.5 μm, to form a coating layer, and the formed coating layer was dried in a third heating process zone (atmosphere temperature of 100° C.) to form the back coating layer.

The magnetic tape obtained as described above was slit to have a width of ½ inches (0.0127 meters), and the burnishing treatment and the wiping treatment were performed with respect to the surface of the magnetic layer. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-052544A (JP-H06-052544A). For the treatment conditions, the treatment conditions disclosed in Example 12 of JP1994-052544A (JP-H06-052544A).

After the burnishing treatment and the wiping treatment, a calendar process (surface smoothing treatment) was performed with a calendar roll configured of only a metal roll, at a speed of 80 m/min, linear pressure of 300 kg/cm (294 kN/m), and a calendar temperature (surface temperature of a calendar roll) shown in Table 1.

Then, a heating process (curing process) was performed in the environment of the atmosphere temperature of 70° C. for 36 hours, and then, a servo pattern was formed on the magnetic layer by a commercially available servo writer.

By doing so, a magnetic tape of Example 1 was obtained.

Example 4 and Comparative Examples 1 to 6

A magnetic tape was manufactured in the same manner as in Example 1, except that various conditions shown in Table 1 were changed as shown in Table 1.

In Table 1, in the comparative examples in which "no alignment process" is shown in the column of "formation and alignment of magnetic layer", the magnetic tape was manufactured without performing the alignment process regarding the coating layer of the magnetic layer forming composition.

In Table 1, in the comparative examples in which "not performed" is shown in the column of the cooling zone staying time and the column of the burnishing treatment before the curing process, a magnetic tape was manufactured by a manufacturing step not including a cooling zone in the magnetic layer forming step and not performing the burnishing treatment and the wiping treatment before the curing process.

Example 2

After forming the non-magnetic layer, the magnetic layer forming composition was applied on the surface of the non-magnetic layer so that the thickness after drying becomes 25 nm to form a first coating layer. The first coating layer was passed through the atmosphere at the atmosphere temperature shown in Table 1 (magnetic layer drying temperature) without application of a magnetic field to form a first magnetic layer (no alignment process).

After that, the magnetic layer forming composition was applied on the surface of the first magnetic layer so that the thickness after drying becomes 25 nm to form a second coating layer. The cooling step was performed by causing the formed second coating layer to pass the cooling zone in which the atmosphere temperature was adjusted to 0° C. for the staying time shown in Table 1, while the second coating layer was wet. After that, the homeotropic alignment process was performed by applying a magnetic field having a strength shown in Table 1 in the vertical direction with respect to the surface of the second coating layer in the alignment zone, and drying was performed in the second heating process zone (atmosphere temperature: magnetic layer drying temperature in Table 1) to form a second magnetic layer.

A magnetic tape was manufactured in the same manner as in Example 1, except that the multilayered magnetic layer was formed as described above.

Example 3

A magnetic tape was manufactured in the same manner as in Example 2, except that the cooling zone staying time was changed as shown in Table 1.

Comparative Example 7

After forming the non-magnetic layer, the magnetic layer forming composition was applied on the surface of the non-magnetic layer so that the thickness after drying becomes 25 nm to form a first coating layer. The homeotropic alignment process and the drying process were performed by applying a magnetic field having a strength shown in Table 1 in the vertical direction with respect to the surface of the first coating layer using opposing magnet in the atmosphere at the atmosphere temperature shown in Table 1 (magnetic layer drying temperature) while the first coating layer was wet, and a first magnetic layer was formed.

After that, the magnetic layer forming composition was applied on the surface of the first magnetic layer so that the thickness after drying becomes 25 nm to form a second coating layer. The second coating layer was passed through the atmosphere at the atmosphere temperature shown in Table 1 (magnetic layer drying temperature) without application of a magnetic field to form a second magnetic layer (no alignment process).

A magnetic tape was manufactured in the same manner as in Comparative Example 2, except that the multilayered magnetic layer was formed as described above.

Comparative Example 8

After forming the non-magnetic layer, the magnetic layer forming composition was applied on the surface of the non-magnetic layer so that the thickness after drying becomes 25 nm to form a first coating layer. The homeotropic alignment process and the drying process were performed by applying a magnetic field having a strength shown in Table 1 in the vertical direction with respect to the surface of the first coating layer using opposing magnet in the atmosphere at the atmosphere temperature shown in Table 1 (magnetic layer drying temperature) while the first coating layer was wet, and a first magnetic layer was formed.

After that, the magnetic layer forming composition was applied on the surface of the first magnetic layer so that the thickness after drying becomes 25 nm to form a second coating layer. The second coating layer was passed through the atmosphere at the atmosphere temperature shown in Table 1 (magnetic layer drying temperature) without application of a magnetic field to form a second magnetic layer (no alignment process).

A magnetic tape was manufactured in the same manner as in Comparative Example 6, except that the multilayered magnetic layer was formed as described above, and the magnetic tape was manufactured by the manufacturing step not including the cooling zone in the magnetic layer forming step and not performing the burnishing treatment and the wiping treatment before the curing process.

Comparative Example 9

After forming the non-magnetic layer, the magnetic layer forming composition was applied on the surface of the non-magnetic layer so that the thickness after drying becomes 25 nm to form a first coating layer. The first coating layer was passed through the atmosphere at the atmosphere temperature shown in Table 1 (magnetic layer drying temperature) without application of a magnetic field to form a first magnetic layer (no alignment process).

After that, the magnetic layer forming composition was applied on the surface of the first magnetic layer so that the thickness after drying becomes 25 nm to form a second coating layer. The homeotropic alignment process and the drying process were performed by applying a magnetic field having a strength shown in Table 1 in the vertical direction with respect to the surface of the second coating layer using opposing magnet in the atmosphere at the atmosphere temperature shown in Table 1 (magnetic layer drying temperature) while the second coating layer was wet, and a second magnetic layer was formed.

A magnetic tape was manufactured in the same manner as in Comparative Example 3, except that the multilayered magnetic layer was formed as described above.

Evaluation of Physical Properties of Magnetic Tape (1) Measurement of Logarithmic Decrement of Magnetic Layer The logarithmic decrement of the magnetic layer of the magnetic tape was acquired by the method described above by using a rigid-body pendulum type physical properties testing instrument RPT-3000W manufactured by A&D Company, Limited (pendulum: brass, substrate: glass substrate, a rate of temperature increase of substrate: 5° C./min) as the measurement device. A measurement sample cut out from the magnetic tape was placed on a glass substrate having a size of approximately 3 cm× approximately 5 cm, by being fixed at 4 portions with a fixing tape (Kapton tape manufactured by Du Pont-Toray Co., Ltd.) as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

(2) Thicknesses of Non-Magnetic Support and Each Layer

The thicknesses of the magnetic layer, the non-magnetic layer, the non-magnetic support, and the back coating layer of each manufactured magnetic tape were measured by the following method. As a result of the measurement, in all of the magnetic tapes, the thickness of the magnetic layer was 50 nm, the thickness of the non-magnetic layer was 0.7 μm, the thickness of the non-magnetic support was 5.0 μm, and the thickness of the back coating layer was 0.5 μm.

The thicknesses of the magnetic layer, the non-magnetic layer, and the non-magnetic support measured here were used for calculating the following refractive index.

(i) Manufacturing of Cross Section Observation Sample

A cross section observation sample including all regions of the magnetic tape from the magnetic layer side surface to the back coating layer side surface in the thickness direction was manufactured according to the method disclosed in paragraphs 0193 and 0194 of JP2016-177851A.

(ii) Thickness Measurement

The manufactured sample was observed with the STEM and a STEM image was captured. This STEM image was a STEM-high-angle annular dark field (HAADF) image which is captured at an acceleration voltage of 300 kV and a magnification ratio of imaging of 450,000, and the imaging was performed so that entire region of the magnetic tape from the magnetic layer side surface to the back coating layer side surface in the thickness direction in one image. In the STEM image obtained as described above, a linear line connecting both ends of a line segment showing the surface of the magnetic layer was determined as a reference line showing the surface of the magnetic tape on the magnetic layer side. In a case where the STEM image was captured so that the magnetic layer side of the cross section observation sample was positioned on the upper side of the image and the back coating layer side was positioned on the lower side, for example, the linear line connecting both ends of the line segment described above is a linear line connecting an intersection between a left side of the image (shape is a rectangular or square shape) of the STEM image and the line segment, and an intersection between a right side of the STEM image and the line segment to each other. In the same manner as described above, a reference line showing the interface between the magnetic layer and the non-magnetic layer, a reference line showing the interface between the non-magnetic layer and the non-magnetic support, a reference line showing the interface between the non-magnetic support and the back coating layer, and a reference line showing the surface of the magnetic tape on the back coating layer side were determined.

The thickness of the magnetic layer was obtained as the shortest distance from one position randomly selected on the reference line showing the surface of the magnetic tape on the magnetic layer side to the reference line showing the interface between the magnetic layer and the non-magnetic layer. In the same manner as described above, the thicknesses of the non-magnetic layer, the non-magnetic support, and the back coating layer were obtained.

(3) ΔN of Magnetic Layer

Hereinafter, M-2000U manufactured by J. A. Woollam Co., Inc. was used as the ellipsometer. The creating and fitting of a double-layer model or a single-layer model were performed with WVASE32 manufactured by J. A. Woollam Co., Inc. as the analysis software.

(i) Measurement Refractive Index of Non-Magnetic Support

A sample for measurement was cut out from each magnetic tape, the back coating layer of the sample for measurement was wiped off and removed using cloth permeated with methyl ethyl ketone to expose the surface of the non-magnetic support, and then, this surface is roughened with sand paper so that reflected light of the exposed surface is not detected in the measurement which will be performed after this with the ellipsometer.

After that, by wiping off and removing the magnetic layer and the non-magnetic layer of the sample for measurement using the cloth permeated with methyl ethyl ketone and bonding a surface of a silicon wafer and the roughened surface to each other using static electricity, the sample for measurement was disposed on the silicon wafer so that the surface of the non-magnetic support exposed by removing the magnetic layer and the non-magnetic layer (hereinafter, referred to as the "surface of the non-magnetic support on the magnetic layer side") faced upward.

The incidence ray was incident to the surface of the non-magnetic support of the sample for measurement on the magnetic layer side on the silicon wafer using the ellipsometer as described above, to measure Δ and ψ. By using the obtained measurement values and the thickness of the non-magnetic support obtained in the section (2), the refractive indexes of the non-magnetic support (the refractive index in a longitudinal direction, the refractive index in a width direction, the refractive index in a thickness direction measured by incidence of incidence ray in the longitudinal direction, and the refractive index in a thickness direction measured by incidence of incidence ray in the width direction) were obtained by the method described above.

(ii) Measurement of Refractive Index of Non-Magnetic Layer

A sample for measurement was cut out from each magnetic tape, the back coating layer of the sample for measurement was wiped off and removed using cloth permeated with methyl ethyl ketone to expose the surface of the non-magnetic support, and then, this surface is roughened with sand paper so that reflected light of the exposed surface is not detected in the measurement which will be performed after this with the spectroscopic ellipsometer.

After that, the surface of the magnetic layer of the sample for measurement was wiped off using the cloth permeated with methyl ethyl ketone, the magnetic layer was removed to expose the surface of the non-magnetic layer, and then, the sample for measurement was disposed on the silicon wafer in the same manner as in the section (i).

The measurement regarding the surface of the non-magnetic layer of the sample for measurement on the silicon wafer was performed using the ellipsometer, and the refractive indexes of the non-magnetic layer (the refractive index in a longitudinal direction, the refractive index in a width direction, the refractive index in a thickness direction measured by incidence of incidence ray in the longitudinal direction, and the refractive index in a thickness direction measured by incidence of incidence ray in the width direction) were obtained by the method described above by spectral ellipsometry.

(iii) Measurement of Refractive Index of Magnetic Layer

A sample for measurement was cut out from each magnetic tape, the back coating layer of the sample for measurement was wiped off and removed using cloth permeated with methyl ethyl ketone to expose the surface of the non-magnetic support, and then, this surface is roughened with sand paper so that reflected light of the exposed surface is not detected in the measurement which will be performed after this with the spectroscopic ellipsometer.

After that, the sample for measurement was disposed on the sample for measurement on the silicon wafer, in the same manner as in the section (i).

The measurement regarding the surface of the magnetic layer of the sample for measurement on the silicon wafer was performed using the ellipsometer, and the refractive indexes of the magnetic layer (the refractive index Nx in a longitudinal direction, the refractive index Ny in a width direction, the refractive index $Nz_1$ in a thickness direction measured by incidence of incidence ray in the longitudinal direction, and the refractive index $Nz_2$ in a thickness direction measured by incidence of incidence ray in the width direction) were obtained by the method described above by spectral ellipsometry. Nxy and Nz were obtained from the obtained values, and the absolute value ΔN of the difference of these values was obtained. Regarding all of magnetic tapes of the examples and the comparative examples, the obtained Nxy was a value greater than Nz (that is, Nxy>Nz).

Vertical Squareness Ratio (SQ)

A vertical squareness ratio of the magnetic tape is a squareness ratio measured regarding the magnetic tape in a vertical direction. The "vertical direction" described regarding the squareness ratio is a direction orthogonal to the surface of the magnetic layer. Regarding each magnetic tape of the examples and the comparative examples, the vertical squareness ratio was obtained by sweeping an external magnetic field in the magnetic tape at a measurement temperature of 23° C.±1° C. using an vibrating sample magnetometer (manufactured by Toei Industry Co., Ltd.) under conditions of a maximum external magnetic field of 1194 kA/m (15 kOe) and a scan speed of 4.8 kA/m/sec (60 Oe/sec). The measurement value is a value after diamagnetic field correction, and is obtained as a value obtained by subtracting magnetization of a sample probe of the vibrating sample magnetometer as background noise. In one aspect, the vertical squareness ratio of the magnetic tape is preferably 0.60 to 1.00 and more preferably 0.65 to 1.00. In addition, in one aspect, the vertical squareness ratio of the magnetic tape can be, for example, equal to or smaller than 0.90, equal to or smaller than 0.85, or equal to or smaller than 0.80, and can also be greater than these values.

Missing Pulse Generation Frequency in Low Temperature and High Humidity Environment The following measurement was performed in the low temperature and high humidity environment of a temperature of 13° C. and relative humidity of 80%.

A magnetic tape cartridge accommodating each magnetic tape (magnetic tape total length of 500 m) of the examples and the comparative examples was set in a drive of Linear Tape-Open Generation 6 (LTO-G6) manufactured by IBM, and the magnetic tape was subjected to reciprocating running 1,500 times at tension of 0.6 N and a running speed of 8 m/sec.

The magnetic tape cartridge after the running was set in a reference drive (LTO-G6 drive manufactured by IBM), and the magnetic tape is allowed to run to perform the recording and reproducing. A reproducing signal during the running was introduced to an external analog/digital (AD) conversion device. A signal having a reproducing signal amplitude which is decreased by 70% or more than an average (average of measured values at each track) was set as a missing pulse, a generation frequency (number of times of the generation) thereof was divided by the total length of the magnetic tape to obtain a missing pulse generation frequency (unit: times/m) per unit length (per 1 m) of the magnetic tape. In a case where the missing pulse generation frequency is equal to or smaller than 5 times/m, the magnetic tape can be determined as a magnetic tape having high reliability in practice.

The results of the above evaluation are shown in Table 1 (Table 1-1 to Table 1-4).

TABLE 1-1

|  | Example 1 | Example 2 | Example 3 | Example 4 |
|---|---|---|---|---|
| Magnetic liquid bead dispersion time | 50 hours | 50 hours | 50 hours | 50 hours |
| Magnetic liquid dispersion bead diameter | 0.1 mm | 0.1 mm | 0.1 mm | 0.1 mm |
| Magnetic liquid Content of $SO_3Na$ group of polyurethane resin | 330 eq/ton | 330 eq/ton | 330 eq/ton | 330 eq/ton |
| Magnetic liquid Content of $SO_3Na$ group-containing polyurethane resin | 15.0 parts | 15.0 parts | 15.0 parts | 15.0 parts |
| Non-magnetic layer forming composition dispersion time | 24 hours | 24 hours | 24 hours | 24 hours |
| Magnetic layer drying temperature | 50° C. | 50° C. | 50° C. | 50° C. |
| Calender temperature | 100° C. | 100° C. | 100° C. | 100° C. |
| Formation and alignment of magnetic layer | Homeotropic alignment 0.5 T | Second layer: homeotropic alignment 0.5 T/ First layer: no alignment process | Second layer: homeotropic alignment 0.5 T/ First layer: no alignment process | Homeotropic alignment 0.2 T |
| Cooling zone staying time | 1 second | 1 second | 180 seconds | 1 second |
| Burnishing treatment before curing process | Performed | Performed | Performed | Performed |
| Result Vertical squareness ratio (SQ) | 0.66 | 0.60 | 0.60 | 0.60 |
| ΔN | 0.30 | 0.35 | 0.35 | 0.25 |
| Logarithmic decrement of magnetic layer | 0.048 | 0.048 | 0.015 | 0.048 |
| Missing pulse generation frequency (times/m) | 4 | 2 | 1 | 4 |

TABLE 1-2

|  | Comparative Example 1 | Comparative Example 2 | Comparative Example 3 |
|---|---|---|---|
| Magnetic liquid bead dispersion time | 6 hours | 50 hours | 6 hours |
| Magnetic liquid dispersion bead diameter | 1 mm | 0.1 mm | 1 mm |
| Magnetic liquid Content of $SO_3Na$ group of polyurethane resin | 60 eq/ton | 330 eq/ton | 60 eq/ton |
| Magnetic liquid Content of $SO_3Na$ group-containing polyurethane resin | 25.0 parts | 15.0 parts | 25.0 parts |
| Non-magnetic layer forming composition dispersion time | 3 hours | 24 hours | 3 hours |
| Magnetic layer drying temperature | 70° C. | 50° C. | 70° C. |
| Calender temperature | 80° C. | 100° C. | 80° C. |
| Formation and alignment of magnetic layer | No alignment process | Homeotropic alignment 0.5 T | Homeotropic alignment 0.5 T |
| Cooling zone staying time | Not performed | Not performed | Not performed |
| Burnishing treatment before curing process | Not performed | Not performed | Not performed |
| Result Vertical squareness ratio (SQ) | 0.50 | 0.66 | 0.55 |
| ΔN | 0.10 | 0.30 | 0.20 |
| Logarithmic decrement of magnetic layer | 0.060 | 0.060 | 0.060 |
| Missing pulse generation frequency (times/m) | 10 | 7 | 9 |

TABLE 1-3

|  | Comparative Example 4 | Comparative Example 5 | Comparative Example 6 |
|---|---|---|---|
| Magnetic liquid bead dispersion time | 6 hours | 50 hours | 96 hours |
| Magnetic liquid dispersion bead diameter | 1 mm | 0.1 mm | 0.1 mm |
| Magnetic liquid Content of $SO_3Na$ group of polyurethane resin | 60 eq/ton | 330 eq/ton | 330 eq/ton |
| Magnetic liquid Content of $SO_3Na$ group-containing polyurethane resin | 25.0 parts | 15.0 parts | 10.0 parts |
| Non-magnetic layer forming composition dispersion time | 3 hours | 24 hours | 48 hours |
| Magnetic layer drying temperature | 70° C. | 50° C. | 30° C. |
| Calender temperature | 80° C. | 100° C. | 110° C. |
| Formation and alignment of magnetic layer | Homeotropic alignment 0.5 T | No alignment process | Homeotropic alignment 0.5 T |
| Cooling zone staying time | 1 second | Not performed | 1 second |
| Burnishing treatment before curing process | Performed | Not performed | Performed |
| Result Vertical squareness ratio (SQ) | 0.55 | 0.53 | 0.80 |

TABLE 1-3-continued

|  | Comparative Example 4 | Comparative Example 5 | Comparative Example 6 |
|---|---|---|---|
| ΔN | 0.20 | 0.20 | 0.45 |
| Logarithmic decrement of magnetic layer | 0.048 | 0.060 | 0.048 |
| Missing pulse generation frequency (times/m) | 7 | 10 | 8 |

TABLE 1-4

|  |  | Comparative Example 7 | Comparative Example 8 | Comparative Example 9 |
|---|---|---|---|---|
| Magnetic liquid bead dispersion time | | 50 hours | 96 hours | 6 hours |
| Magnetic liquid dispersion bead diameter | | 0.1 mm | 0.1 mm | 1 mm |
| Magnetic liquid Content of SO$_3$Na group of polyurethane resin | | 330 eq/ton | 330 eq/ton | 60 eq/ton |
| Magnetic liquid Content of SO$_3$Na group-containing polyurethane resin | | 15.0 parts | 10.0 parts | 25.0 parts |
| Non-magnetic layer forming composition dispersion time | | 24 hours | 48 hours | 3 hours |
| Magnetic layer drying temperature | | 50° C. | 30° C. | 70° C. |
| Calender temperature | | 100° C. | 110° C. | 80° C. |
| Formation and alignment of magnetic layer | | Second layer: no alignment process/ First layer: homeotropic alignment 0.5 T | Second layer: no alignment process/ First layer: homeotropic alignment 0.5 T | Second layer: homeotropic alignment 0.5 T/ First layer: no alignment process |
| Cooling zone staying time | | Not performed | Not performed | Not performed |
| Burnishing treatment before curing process | | Not performed | Not performed | Not performed |
| Result | Vertical squareness ratio (SQ) | 0.60 | 0.66 | 0.53 |
|  | ΔN | 0.20 | 0.20 | 0.20 |
|  | Logarithmic decrement of magnetic layer | 0.060 | 0.060 | 0.060 |
|  | Missing pulse generation frequency (times/m) | 11 | 9 | 11 |

From the results shown in Table 1, in the magnetic tapes of Examples 1 to 4 in which ΔN and the logarithmic decrement of the magnetic layer are respectively in the range described above, it is possible to confirm that the missing pulse generation frequency in the low temperature and high humidity environment is decreased, compared to the magnetic tapes of Comparative Examples 1 to 9.

In general, the squareness ratio is known as an index for a state of the ferromagnetic powder present in the magnetic layer. However, as shown in Table 1, even in a case of the magnetic tapes having the same vertical squareness ratios, ΔN are different from each other (for example, Example 1 and Comparative Example 8). The inventors have thought that this shows that ΔN is a value which is affected by other factors, in addition to the state of the ferromagnetic powder present in the magnetic layer.

One aspect of the invention is effective in a technical field of various magnetic recording media such as a magnetic tape for data storage.

What is claimed is:

1. A magnetic tape comprising:
a non-magnetic support;
a magnetic layer including ferromagnetic powder and a binding agent on the non-magnetic support, and
a non-magnetic layer including a non-magnetic powder and a binding agent between the non-magnetic support and the magnetic layer,
wherein the thickness of the non-magnetic layer is 0.1 to 1.5 μm,
the absolute value ΔN of the difference between the refractive index Nxy measured regarding an in-plane direction of the magnetic layer and the refractive index Nz measured regarding a thickness direction of the magnetic layer is 0.25 to 0.40,
the logarithmic decrement acquired by a pendulum viscoelasticity test performed regarding the surface of the magnetic layer is equal to or smaller than 0.050, and
the logarithmic decrement on the magnetic layer side is determined by the following method:
securing a measurement sample of the magnetic tape with the measurement surface, which is the surface on the magnetic layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
inducing initial oscillation of the pendulum;
monitoring the displacement of the pendulum while it is oscillating to obtain a displacement-time curve for a measurement interval of greater than or equal to 10 minutes; and
obtaining the logarithmic decrement Δ from the following equation:

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1,
wherein the difference Nxy–Nz between the refractive index Nxy and the refractive index Nz is 0.25 to 0.40.

3. The magnetic tape according to claim 1,
wherein the logarithmic decrement is 0.010 to 0.050.

4. The magnetic tape according to claim 1,
wherein the thickness of the non-magnetic layer is 0.1 to 1.0 μm.

5. The magnetic tape according to claim 1,
wherein the thickness of the non-magnetic layer is 0.1 to 0.7 μm.

6. The magnetic tape according to claim 1, further comprising:
a back coating layer including a non-magnetic powder and a binding agent on a surface of the non-magnetic support opposite to a surface provided with the magnetic layer.

7. A magnetic recording and reproducing device comprising:
the magnetic tape according to claim 1; and
a magnetic head.

* * * * *